(12) United States Patent
Khaitan et al.

(10) Patent No.: US 11,954,580 B2
(45) Date of Patent: Apr. 9, 2024

(54) SPATIAL TILING OF COMPUTE ARRAYS WITH SHARED CONTROL

(71) Applicant: Meta Platforms, Inc., Menlo Park, CA (US)

(72) Inventors: Harshit Khaitan, San Jose, CA (US); Ganesh Venkatesh, San Jose, CA (US); Vikas Chandra, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 760 days.

(21) Appl. No.: 17/022,950

(22) Filed: Sep. 16, 2020

(65) Prior Publication Data
US 2022/0083844 A1    Mar. 17, 2022

(51) Int. Cl.
| | | |
|---|---|---|
| *G06N 3/063* | (2023.01) | |
| *G06F 9/38* | (2018.01) | |
| *G06F 9/50* | (2006.01) | |
| *G06N 3/084* | (2023.01) | |
| *G06N 5/046* | (2023.01) | |

(52) U.S. Cl.
CPC ......... G06N 3/063 (2013.01); G06F 9/3887 (2013.01); G06F 9/3891 (2013.01); G06F 9/5027 (2013.01); G06N 3/084 (2013.01); G06N 5/046 (2013.01)

(58) Field of Classification Search
CPC ........ G06N 3/063; G06N 3/084; G06N 5/046; G06F 9/3887; G06F 9/3891; G06F 9/5027
See application file for complete search history.

(56) References Cited

U.S. PATENT DOCUMENTS

| | | |
|---|---|---|
| 9,710,265 B1 | 7/2017 | Temam |
| 9,836,691 B1 | 12/2017 | Narayanaswami |
| 10,175,980 B2 | 1/2019 | Temam |
| 10,496,326 B2 | 12/2019 | Temam |
| 10,534,607 B2 | 1/2020 | Temam |

(Continued)

OTHER PUBLICATIONS

Dettmers, Deep Learning in a Nutshell: Core Concepts, pp. 1-10, 2020.

(Continued)

*Primary Examiner* — Alan Chen
(74) *Attorney, Agent, or Firm* — Greenberg Traurig, LLP

(57) ABSTRACT

In one embodiment, a method for machine learning acceleration includes receiving, by a shared controller of a tensor processor cluster that includes multiple tensor processors, a multi-cycle instruction, determining, based on the instruction, a sequence of vector operations to be executed by the tensor processors and address information usable to determine a respective spatial partition of an input tensor on which each tensor processor is to operate when performing each vector operation. The method also includes, for each vector operation in the sequence, generating, based on the address information, a common address offset, relative to a respective base address associated with each tensor processor, at which each tensor processor is to retrieve the respective spatial partition on which the tensor processor is to operate, multicasting the common address offset to the tensor processors, and controlling the tensor processors to execute the vector operation in parallel and in lock step.

18 Claims, 12 Drawing Sheets

(56) References Cited

U.S. PATENT DOCUMENTS

| | | |
|---|---|---|
| 10,802,956 B2 | 10/2020 | Temam |
| 11,422,801 B2 * | 8/2022 | Temam .................. G06N 3/045 |
| 11,586,907 B2 * | 2/2023 | Singh ..................... G06N 3/045 |
| 2017/0220352 A1 * | 8/2017 | Woo .................... G06F 9/30054 |
| 2019/0205756 A1 | 7/2019 | Temam |
| 2020/0005128 A1 | 1/2020 | Temam |

OTHER PUBLICATIONS

Jiao, et al., High-Performance Machine Learning, 2020 IEEE, pp. 136-138, Feb. 18, 2020.

Emer, et al., DNN Accelerator Architectures, ISCA Tutorial, 70 pages, 2019.

* cited by examiner

SPATIAL TILING OF COMPUTE ARRAYS WITH SHARED CONTROL

TECHNICAL FIELD

This disclosure generally relates to accelerators for machine learning models and, more particularly, to a multi-level control architecture designed to optimally exploit parallelism provided by tensor processors in a machine learning accelerator.

BACKGROUND

Neural networks are increasingly being used to implement machine learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Therefore, existing ML accelerators focus on using high compute parallelism along with an optimized data orchestration throughout the memory hierarchy to speed up the processing of convolutional layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Innovative aspects of the subject matter described in this specification may be embodied in a system for machine learning acceleration that includes a plurality of tensor processor clusters, each comprising a plurality of tensor processors and a cluster-level controller. The cluster-level controller may be configured to receive a multi-cycle instruction, and to determine, based on the multi-cycle instruction, (1) a sequence of vector operations to be executed by the tensor processors and (2) address information usable to determine a respective spatial partition of an input tensor on which each tensor processor is to operate when performing each vector operation in the sequence. The cluster-level controller may also be configured to, for each vector operation in the sequence, generate, based on the address information, a common address offset, relative to a respective base address associated with each tensor processor in the cluster, at which each tensor processor is to retrieve the respective spatial partition of the input tensor on which the tensor processor is to operate, multicast the common address offset to the tensor processors in the cluster, and control the tensor processors in the cluster to execute the vector operation in lock step.

Other embodiments of these aspects include corresponding methods, apparatus, and computer programs, configured to perform the actions of the methods, encoded on computer storage devices.

These and other embodiments may each optionally include one or more of the following features. For instance, in one or more of the disclosed embodiments, a first multi-cycle instruction received by a given one of the plurality of tensor processor clusters may represent a portion of a machine-learning program, the machine-learning program comprises a plurality of multi-cycle instructions, each of which is associated with one or more convolution operations to be performed in a respective layer in a convolutional neural network, and a first cycle of the first multi-cycle instruction may be associated with a first convolution operation.

In one or more of the disclosed embodiments, the cluster-level controller in the given cluster may be configured to determine, based on the first multi-cycle instruction, (1) a first sequence of vector operations to be executed by the tensor processors in the given cluster and (2) address information usable to determine the respective spatial partition of an input tensor on which each tensor processor in the given cluster is to operate when performing each vector operation in the first sequence of vector operations, and for each vector operation in the first sequence of vector operations, to generate, based on the address information, a common address offset, relative to a respective base address associated with each tensor processor in the given cluster, at which each tensor processor in the given cluster is to retrieve the respective spatial partition of the input tensor on which the tensor processor is to operate, to multicast the common address offset to the tensor processors in the given cluster, and to control the tensor processors in the given cluster to execute the vector operation in lock step. Each of the vector operations in the first sequence of vector operations may comprise one or more of a vector read operation, a vector addition operation, and a vector multiply operation. Each tensor processor in the given cluster may comprise a hardware compute array of multiply-and-accumulate (MAC) computation units configured to execute vector operations on the respective spatial partition of the input tensor on which the tensor processor is to operate when performing each vector operation in the first sequence of vector operations.

In one or more of the disclosed embodiments, the cluster-level controller in the given cluster may be further configured to determine, based on the first multi-cycle instruction, (3) weight information usable to determine weights to be applied in the one or more convolution operations associated with the first multi-cycle instruction, to determine, for at least one vector operation in the first sequence of vector operations and dependent on the weight information, a first subset of the weights associated with the first multi-cycle instruction that are associated with the first convolution operation, and to provide the first subset of the weights that are associated with the first convolution operation to the hardware compute array of at least one of the tensor processors in the given cluster for execution of the first convolution operation in the first cycle of the first multi-cycle instruction.

In one or more of the disclosed embodiments, each tensor processor in the given cluster may be configured to generate a respective spatial partition of an output tensor based on the respective spatial partition of the input tensor on which each tensor processor in the given cluster is to operate using single-instruction-multiple-data (SIMD) parallelism. To implement SIMD parallelism, each tensor processor in the given cluster may be configured to implement data parallelism. The cluster-level controller may be further configured to provide the first subset of the weights that are associated with the first convolution operation to the hardware compute arrays of two or more of the tensor processors in the given cluster for execution of the first convolution operation in the first cycle of the first multi-cycle instruction.

In one or more of the disclosed embodiments, a second cycle of the first multi-cycle instruction may be associated with a second convolution operation, and the cluster-level controller in the given cluster may be further configured to determine, for at least one vector operation in the first sequence of vector operations and dependent on the weight information, a second subset of the weights associated with the first multi-cycle instruction that are associated with the second convolution operation, and to provide the second subset of the weights that are associated with the second convolution operation to the hardware compute arrays of the two or more tensor processors in the given cluster for execution of the second convolution operation in the second cycle of the first multi-cycle instruction.

In one or more of the disclosed embodiments, the cluster-level controller in the given cluster may be further configured to determine, for at least one vector operation in the first sequence of vector operations and dependent on the weight information, a second subset of the weights associated with the first multi-cycle instruction that are associated with the first convolution operation, and to provide the second subset of the weights that are associated with the first convolution operation to the hardware compute array of one of the tensor processors in the given cluster other than the at least one of the one or more tensor processors in the given cluster for execution of the first convolution operation in the first cycle of the first multi-cycle instruction.

In one or more of the disclosed embodiments, the cluster-level controller in the given cluster may be further configured to receive a second multi-cycle instruction, to determine, based on the second multi-cycle instruction, (1) a second sequence of vector operations to be executed by the tensor processors in the given cluster and (2) address information usable to determine the respective spatial partition of an input tensor on which each tensor processor in the given cluster is to operate when performing each vector operation in the second sequence of vector operations, and for each vector operation in the second sequence of vector operations, to generate, based on the address information, a common address offset, relative to a respective base address associated with each tensor processor in the given cluster, at which each tensor processor is to retrieve the respective spatial partition of the input tensor on which the tensor processor is to operate, to multicast the common address offset to the tensor processors in the given cluster, and to control the tensor processors in the given cluster to execute the vector operation in lock step.

In one or more of the disclosed embodiments, the respective spatial partitions of the input tensor on which each tensor processor in each cluster are to operate may be subsets of an input feature map. Each cluster may receive a respective multi-cycle instruction. The respective multi-cycle instructions may be distributed across the clusters in accordance with single-instruction-multiple-data (SIMD) parallelism such that at least two of the clusters receive and execute a same multi-cycle instruction while operating on a different subset of the input feature map, and the at least two clusters operate in parallel and in lock step to execute the same multi-cycle instruction.

In one or more of the disclosed embodiments, each cluster may receive a respective multi-cycle instruction, and the respective multi-cycle instructions may be distributed across the clusters in accordance with single-program-multiple-data (SPMD) parallelism such that at least two of the clusters receive and execute different multi-cycle instructions while operating on the input feature map.

The details of one or more embodiments of the subject matter described in this specification are set forth in the accompanying drawings and the description below. Other potential features, aspects, and advantages of the subject matter will become apparent from the description, the drawings, and the claims.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

DESCRIPTION OF EXAMPLE EMBODIMENTS

Figure 1:
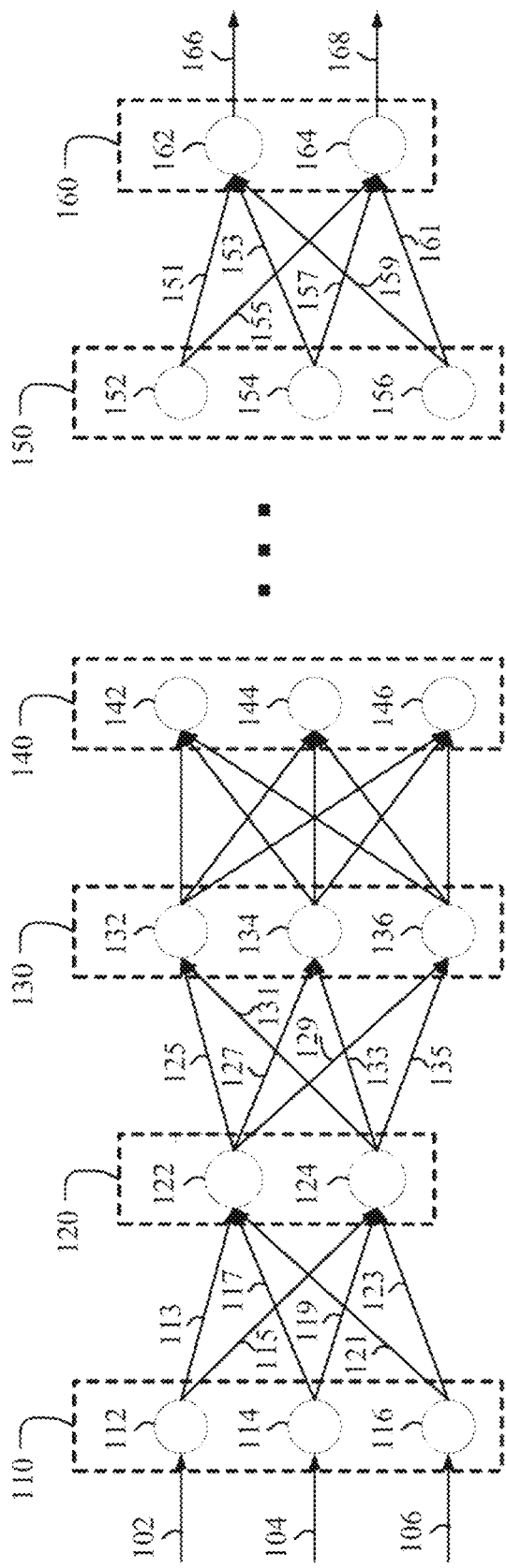
FIG. 1 illustrates selected elements of an example of a multilayer perception (MLP) neural network.

In particular embodiments, this application describes a machine learning accelerator. Specifically, this application relates to a multi-level control architecture designed to optimally exploit parallelism provided by tensor processors in a machine learning accelerator. The machine learning accelerator may include one or more tensor processor clusters, each of which may include multiple tensor processors. Each tensor processor may be a single-instruction-multiple-data (SIMD) machine that includes a compute array capable of performing vector operations to implement data parallelism or model parallelism at the tensor processor or tensor processor cluster level. A compiler analyzes a workload to be performed by the neural network and determines respective coarse-grained tensor instructions to be sent to each tensor processor cluster using a SIMD and/or single-program-multiple-data (SPMD) approach to distribute the workload. The compiler may distribute the workload based on the architecture of the neural network, the number of tensor processor clusters, the number and processing capacity of the tensor processors in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processors, reduce the amount of data movement required between and within tensor processor clusters, and optimize resource utilization in the ML accelerator.

Each coarse-grained tensor instruction sent to a tensor processor cluster may encode information usable by the cluster to perform a multi-cycle operation corresponding to a part of a single neural network layer. In one example, using a SPMD approach, the compiler may distribute the workload such that different tasks are assigned to different tensor processor clusters with some or all of the tensor processor clusters operating on the same input feature set. In another example, using a SIMD approach, the compiler may distribute the workload such that the same tasks are assigned to multiple tensor processors clusters and such that each of those multiple tensor processor clusters operates on different data, such as on a different subset of an input feature set for the neural network.

Each tensor processor cluster may include a shared controller that controls and synchronizes the operations of the tensor processors within the cluster so that they perform a common series of operations in parallel and in lockstep. Each of the coarse-grained tensor instructions received by a tensor processor cluster may encode information usable by its shared controller to determine the subset of the input feature set on which each tensor processor within the cluster is to operate, the common series of operations to be performed by all of the tensor processors within the cluster, the weights to be applied to the subset of the input feature set for each of the operations within the common series of operations, and any non-linear operations that are to be applied to the subset of the input feature set as part of a multi-cycle operation corresponding to a single neural network layer. The shared controller may interpret each received coarse-grained tensor instruction and translate it into a series of fine-grained tensor instructions expressed as machine language instructions that are multicast to the tensor processors in the tensor processor cluster tasked with performing the common series of operations in parallel and in lockstep. Each of these fine-grained tensor instructions may, for example, represent a vector read operation, a vector write operation, a vector addition operation, or a vector multiplication operation to be performed by hardware compute arrays within each tensor processor or may represent a non-linear instruction to be applied to an intermediate output of the hardware compute arrays to produce an element of an output feature set.

When a tensor processor cluster implements data parallelism, all of the tensor processors within the cluster may perform the same common series of operations using the same weights, but each tensor processor in the cluster may operate on a different subset of the input feature set to produce a subset of an output feature set having the same output format and output dimensions. Using this approach, the machine language instructions broadcast to all tensor processors in the cluster may be the same and they may access and apply the same sets of weights at each step. The machine language instructions may be expressed in terms of addresses relative to particular base addresses in one or more dimensions and these base addresses may be different from each other to identify the appropriate subsets of the input feature set on which each tensor processor is to operate.

Before broadcasting a fine-grained tensor instruction corresponding to one of the operations in the common series of operations to be performed by the tensor processors within a tensor processor cluster, the shared controller of the tensor processor cluster may ensure that the appropriate subsets of the input feature set and the weights to be applied for that operation have been loaded into the local memories for each tensor processor. This may include loading multiple sets of weights to be applied by respective operations in the common series of operations prior to initiating the operation of the first of the operations in the series. Once all of the tensor processors have local access to their respective subsets of the input feature set and the appropriate weights to be applied, the shared controller may broadcast the machine language instruction for the upcoming operation.

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

FIG. 1 illustrates selected elements of an example of a multilayer perception neural network, in accordance with particular embodiments. Its structure may include multiple hidden, e.g., internal, layers that map an input layer 110 that receives a set of inputs or a vector input to an output layer 160 that includes a set of outputs or a vector output. Each layer may include any given number of nodes, which are herein illustratively shown as circles within each layer. For example, input layer 110 includes three nodes, shown as nodes 112 114, and 116, and output layer 160 includes two nodes, shown as 162 and 164. The example neural network illustrated in FIG. 1 includes at least four hidden layers but may include additional hidden layers not shown in FIG. 1. In the illustrated example, the first hidden layer 120 includes two nodes, shown as nodes 122 and 124, while hidden layers 130, 140, and 150 each include three nodes, shown as nodes 132, 134, and 136, nodes 142, 144, and 146, and nodes 152, 154, and 156, respectively. Generally, the deeper the MLP (e.g., the greater the number of hidden layers in the MLP), the greater its capacity to learn. The input layer 110 receives a vector input, illustratively shown as a three-dimensional vector consisting of inputs 102, 104 and 106, and may apply the received vector input to the first hidden layer 120 in the sequence of hidden layers. The output layer 160 receives the output from the last hidden layer in the multilayer model, e.g., 150, processes its inputs, and produces a vector output result, illustratively shown as a two-dimensional vector consisting of outputs 166 and 168.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 110 may receive only one input and may be passive, meaning that each node may simply relay the value of its single input to its output(s) thus providing a copy of the input to the output(s).

In the example neural network illustrated in FIG. 1, the outputs of nodes 112, 114, and 116 of input layer 110 feed forward as inputs to hidden layer 120, which includes nodes 122 and 124. The outputs of nodes 122 and 124, in turn, feed forward as inputs to hidden layer 130, which includes nodes 132, 134, and 136, the outputs of nodes 132, 134, and 136 feed forward as inputs to hidden layer 140, which includes nodes 142, 144, and 146, and so on. Finally, the outputs of nodes 152, 154, and 156 of the final hidden layer 150 feed forward as inputs to output layer 160, which includes nodes 162 and 164. Interconnections, or links, between neurons, shown in FIG. 1 as arrows between various nodes, may have respective weights associated with them. For example, the interconnection between node 112 of input layer 110 and node 122 of hidden layer 120 may be associated with a weight 113. In addition, the interconnection between node 112 of input layer 110 and node 124 of hidden layer 120 may be associated with a weight 115, the interconnection between node 114 of input layer 110 and node 122 of hidden layer 120 may be associated with a weight 117, the interconnection between node 114 of input layer 110 and node 124 of hidden layer 120 may be associated with a weight 119, the interconnection between node 116 of input layer 110 and node 122 of hidden layer 120 may be associated with a weight 121, and the interconnection between node 116 of input layer 110 and node 124 of hidden layer 120 may be associated with a weight 123. Similarly, the interconnections between the nodes of hidden layers 120 and 130 may be associated with weights 125, 127, 129, 131, 133, and 135, respectively, and the interconnections between the nodes of hidden layers 150 and output layer 160 may be associated with weights 151, 153, 155, 157, 159, and 161, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
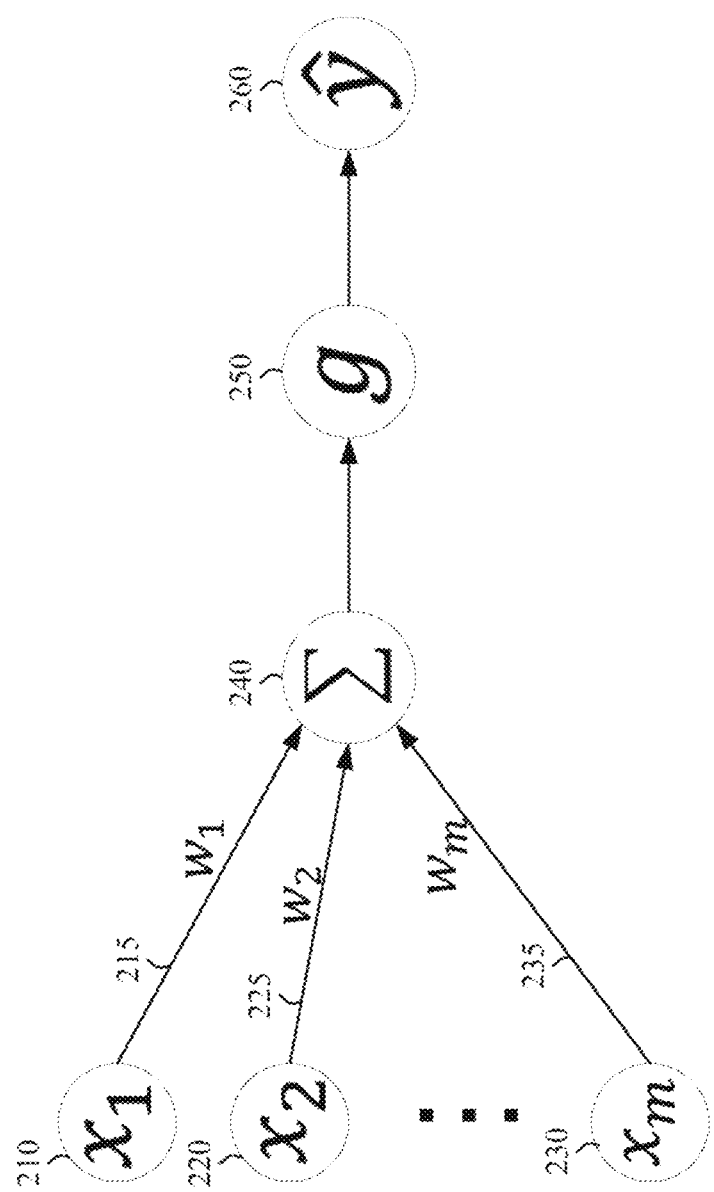
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector ŷ for a particular neural network node given inputs $x_1$ (210), $x_2$ (220), and $x_3$ (230), respective interconnection weights $w_1$ (215), $w_2$ (225), and $w_3$ (235), and a non-linear activation function g (250). In the illustrated example, the output vector ŷ may be determined by applying the activation function g (250) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feedforward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein.

For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For examples, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3:
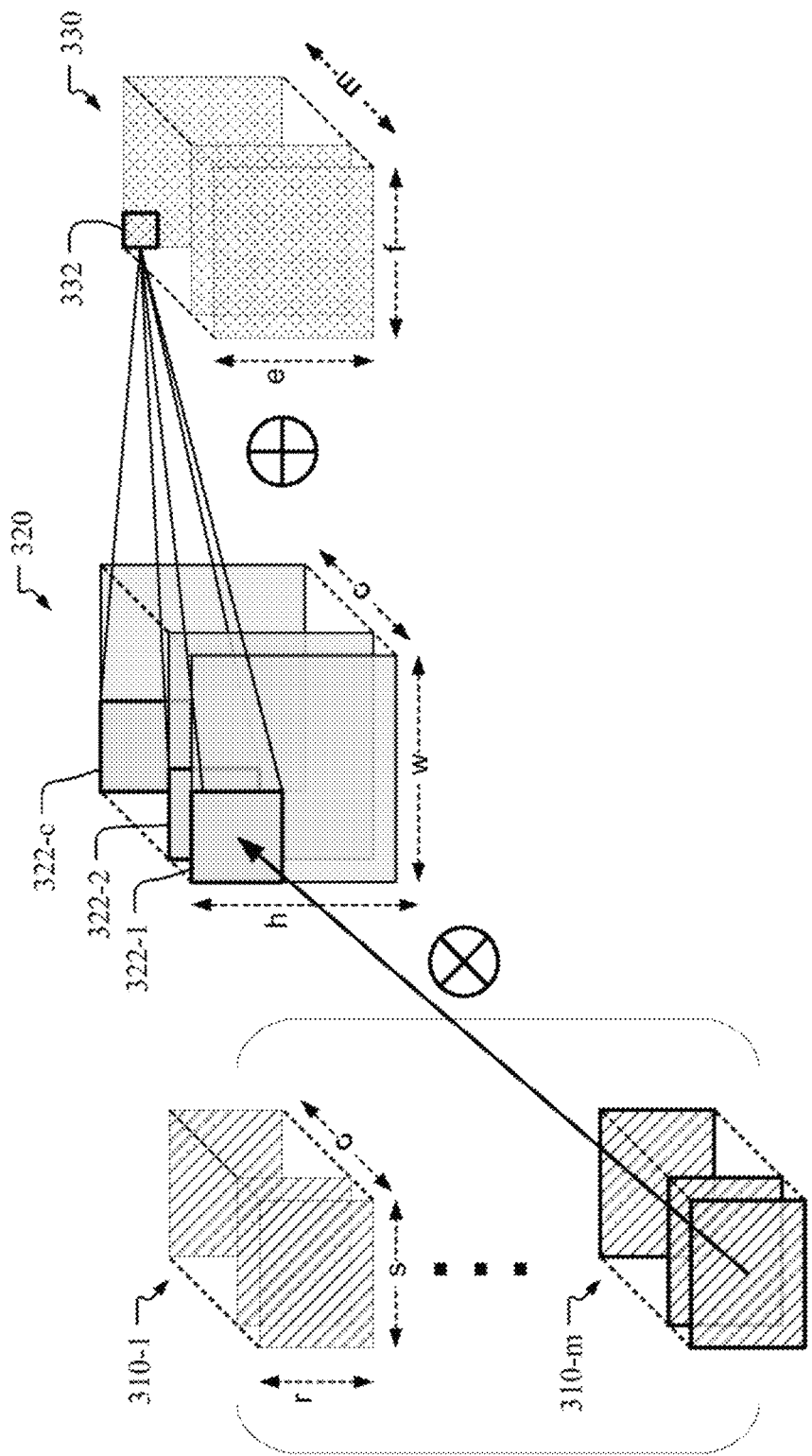
FIG. 3 illustrates selected elements of an example convolutional layer in a convolutional neural network (CNN).

FIG. 3 illustrates selected elements of an example convolutional layer in a convolutional neural network. In the illustrated example, a three-dimensional (3D) output feature map 330 is generated by performing a series of two-dimensional (2D) convolution operations over a 3D input feature map 320 using a collection of 2D convolution filters 310. More specifically, the input feature map 320 has dimensions h (height)×w (width)×c (where c represents the number of input channels) and the output feature map 330 has dimensions e×f×m (where m represents the number of output channels). In this example, multiple filters 310 are to be applied to the input feature map to generate each element, of each channel, of the output feature map. More specifically, a respective different filter 310 is applied to produce the elements of the output feature map for each given output channel. Therefore, the number of filters 310 (i.e., m) matches the number of output channels (m).

As shown in FIG. 3, each 3D filter 310 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 320. More specifically, each 2D kernel of filter 310-m is applied in a convolution operation over the elements in a respective channel of input feature map 320. For example, a first 2D kernel of filter 310-m provides the weights that are multiplied by respective values of the elements in an r×s sized portion 322-1 of the elements of a first channel of input feature map 320, a second 2D kernel of filter 310-m provides the weights that are multiplied by respective values of the elements in an r×s sized portion 322-2 of the elements of a second channel of input feature map 320, and so on, such that a final 2D kernel of filter 310-m provides the weights that are multiplied by respective values of the elements in an r×s sized portion 322-c of the elements of the last channel of input feature map 320. The results of these multiplication operations are then combined to generate a single element 332 of a single channel of output feature map 330, as shown in FIG. 3. This process is repeated as the 2D kernels of filter 310-m are applied to other portions of input feature map 320 to produce the remaining elements of output feature map 330 in the same output channel as element 332, and as the 2D kernels of respective other ones of the filters 310 are applied to input feature map 320 to produce the elements of output feature map 330 in each of the remaining output channels.

Figure 4:
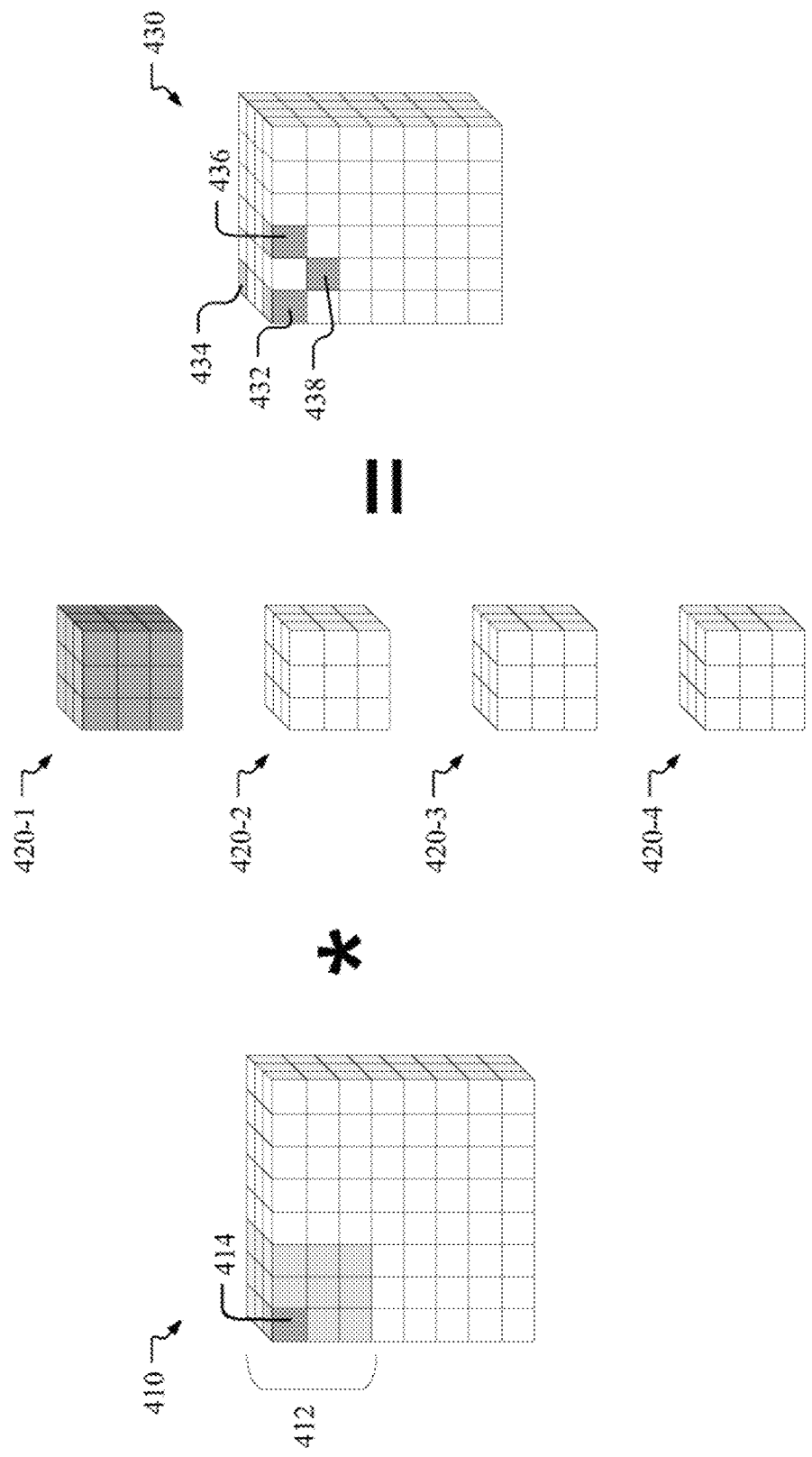
FIG. 4 illustrates an example multi-level convolution operation.

FIG. 4 illustrates an example multi-channel convolution operation, in accordance with particular embodiments. In this example, a multi-channel (3D) output feature map 430 is generated by the application of multiple 3D filters 420 to successive portions of a multi-channel (3D) input feature map 410. In this example, the dimensions of input feature map 430 are X×Y×Zin, where Zin represents the number of input channels, and the dimensions of output feature map 430 are Xout×Yout×Zout, where Zout represents the number of output channels. Each 3D filter 420 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 430 is computed as follows:

[x][y][zout]+=activations[x+kx][y+ky][zin]*weights[kx][ky][zin][zout]

In the illustrated example, there is one 3D filter 420 for each channel (zout) in Zout. More specifically, the illustrated multi-channel convolution uses four 3D filters 420 to generate elements for each x/y position in each of four output channels, respectively, while sweeping the appropriate 2D kernels across and down the elements of input feature map 410 in each of the input channels. For example, the value of element 432 of output feature map 430 is determined by applying highlighted 3D filter 420-1 to the highlighted portion 412 of input feature map 410, i.e., 36 activations including 9 activations in respective x/y positions in each of 4 input channels zin. Similarly, the value of element 434 of output feature map 430 is determined by applying 3D filter 420-4 to the highlighted portion 412 of input feature map 410.

Traversing input feature map 410 in the x dimension involves sweeping the highlighted portion 412 across the input feature map such that element 414 moves one position to the right to identify a next set of activations for each successive iteration in the x dimension. For example, the value of element 436 of output feature map 430 is determined by applying 3D filter 420-1 to the highlighted portion 412 of input feature map 410 after the highlighted portion has been moved from the initial position in which it is shown in FIG. 4 to a location two positions to the right. Traversing input feature map 410 in the y dimension involves sweeping the highlighted portion 412 across the input feature map such that element 414 moves one position down to identify a next set of activations for each successive iteration in the y dimension. For example, the value of element 438 of output feature map 430 is determined by applying 3D filter 420-1 to the highlighted portion 412 of input feature map 410 after the highlighted portion has been moved from the initial position in which it is shown in FIG. 4 to a location one position down and one position to the right.

Performing the multi-channel convolution illustrated in FIG. 4 involves performing a series of 2D convolutions, as follows:

```
for zout in Zout
    for x in Xout
        for y in Yout
            for kx in KernelX
                for ky in KernelY
                    for zin in Zin
                        output[x][y][zout] +=
                            activations[x + kx][y + ky][zin] *
                            weights[kx][ky][zin][zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

for the activation addresses:

```
for x in Xout
    for y in Yout
        for kx in KernelX
            for ky in KernelY
                for zin in Zin
                    activations[x + kx][y + ky][zin],
for the weight addresses:
    for zout in Zout
        for kx in KernelX
            for ky in Kernel Y
                for zin in Zin
                    weights[kx][ky][zin][zout],
and for the output address:
    for zout in Zout
        for x in Xout
            for y in Yout
```

-continued

```
for zin in Zin
    outputs[x][y][zout].
```

Figure 5A:
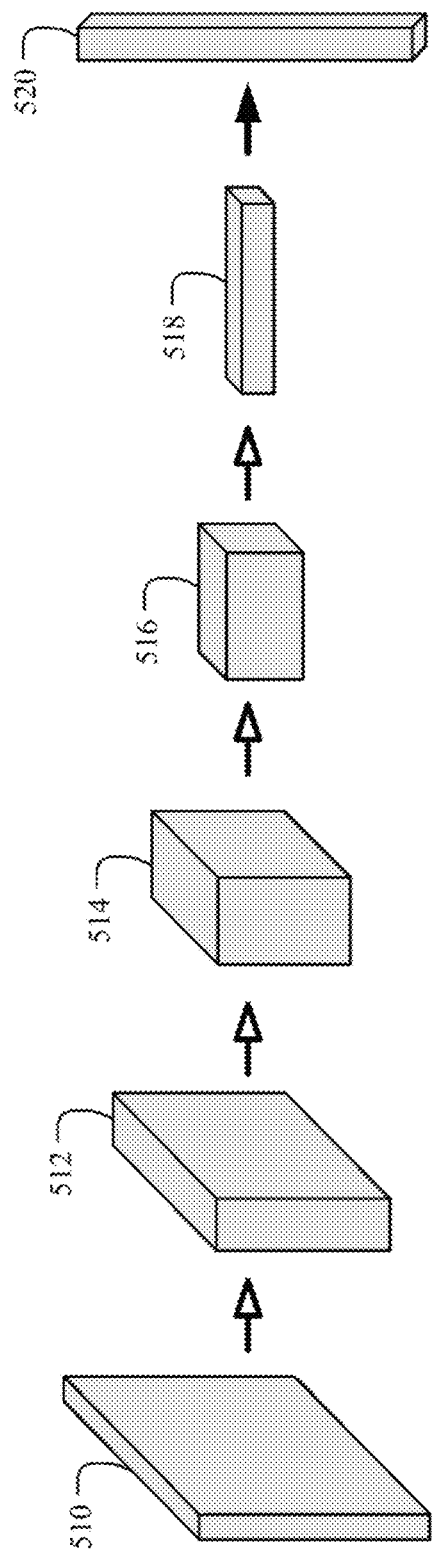
FIG. 5A illustrates an example CNN for a classification-type network.

FIG. 5A illustrates an example convolutional neural network in which an output feature map 520 is generated based on an input feature map 510 in a classification-type neural network. This type of neural network may typically involve a small or medium resolution input, a single vector output, and a relatively large number of output channels. In the illustrated example, intermediate feature maps of different sizes and shapes, shown as feature maps 512, 514, 516 and 518, are generated by performing successive convolution operations on each such intermediate feature map, in turn, and the output feature map 520 is generated by a fully connected (FC) layer operating on the final intermediate feature map 518. As shown in FIG. 5A, it may be typical for the overall size, and corresponding memory requirements, to be reduced for each successive intermediate feature map in a classification-type neural network.

Figure 5B:
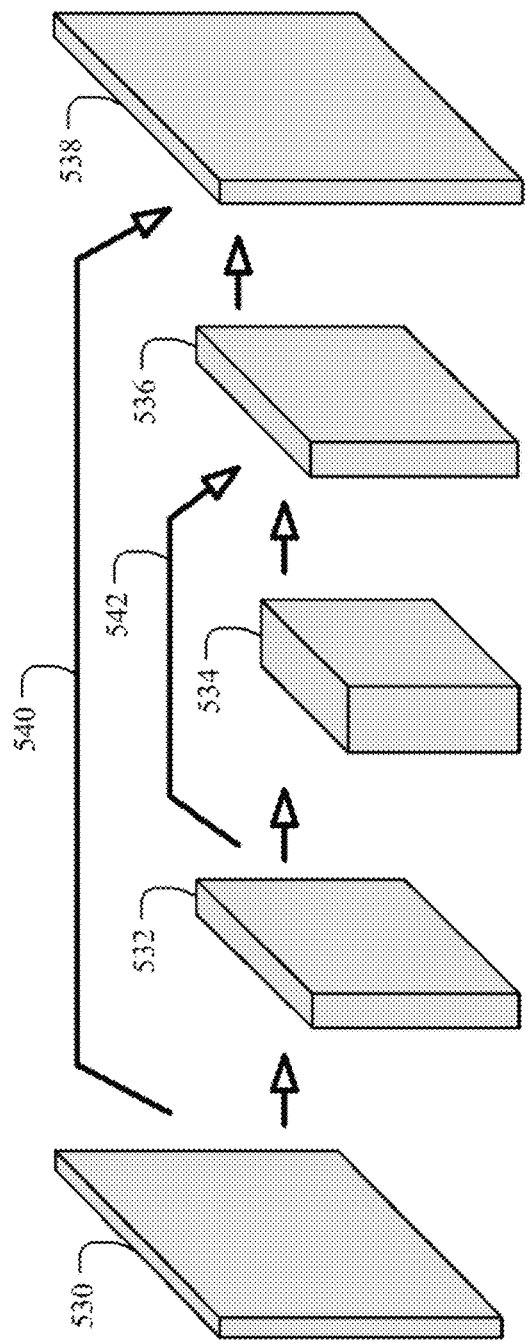
FIG. 5B illustrates an example CNN for a UNet-type network.

FIG. 5B illustrates an example CNN in which an output feature map 538 is generated based on an input feature map 530 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 540 and 542 in FIG. 5B. In the illustrated example, intermediate feature maps of different sizes and shapes, shown as feature maps 532, 534, and 536, are generated using a series of convolution operations prior to the generation of the output feature map 538. In this example, intermediate feature map 532 is generated based on input feature map 530, intermediate feature map 534 is generated based on intermediate feature map 532, intermediate feature map 536 is generated based on both intermediate feature map 534 and on intermediate feature map 532, and output feature map 538 is generated based on both intermediate feature map 536 and input feature map 530. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processors within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

The ML accelerators described herein employ a multi-level control architecture designed to optimally exploit parallelism provided by tensor processors in the ML accelerator. These machine learning accelerators may include one or more tensor processor clusters, each of which may include multiple tensor processors. Each tensor processor may be a single-instruction-multiple-data (SIMD) machine that includes a compute array capable of performing vector operations to implement data parallelism or model parallelism at the tensor processor or tensor processor cluster level. Each tensor processor cluster may include a shared controller that controls and synchronizes the operations of the tensor processors within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets. These and other edge devices may be configured as batchless machine learning computers. For example, they may use machine learning to parallelize the processing of a single image (e.g., in an inference exercise with a batch size of one) rather than to parallelize a training exercise across multiple images of a training set.

Figure 6:
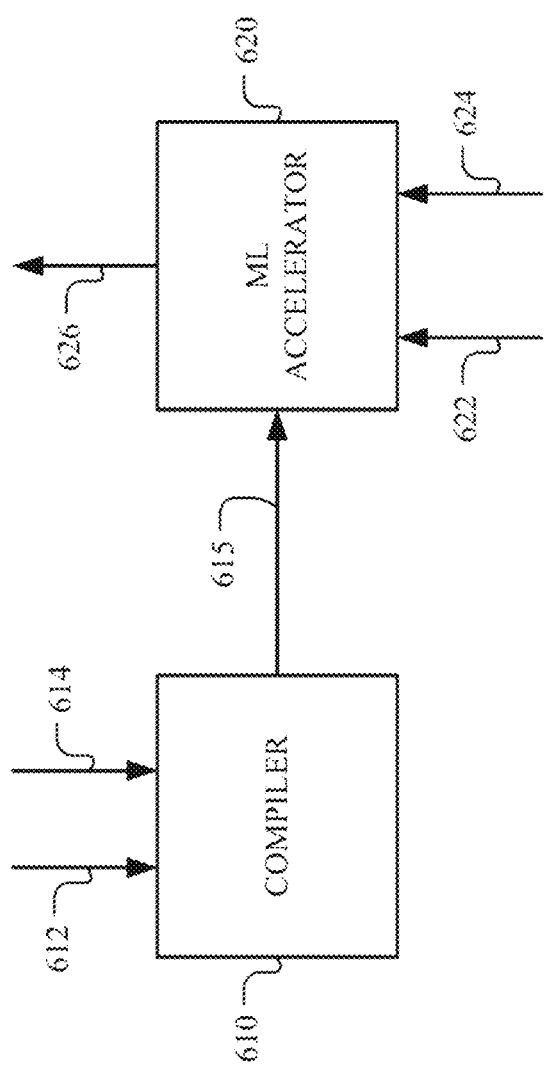
FIG. 6 illustrates selected elements of an example system including a compiler and an ML accelerator.

FIG. 6 illustrates selected elements of an example system including a compiler 610 and an ML accelerator 620. In the illustrated example, compiler 610 generates coarse-grained machine language instructions, shown as tensor instructions 615, based on inputs including programming language instructions 612 and configuration information 614 indicating the configuration of a neural network that is to perform the tensor instructions 615. In this example system, ML accelerator 620 receives the tensor instructions 615 and generates, for input features 622 and applicable weights 624, output features 626. For example, compiler 610 may, in accordance with an instruction set architecture (ISA) that is used to facilitate machine learning processing for a specific hardware architecture, map a single ML operation (such as a convolution operation) to multiple coarse-grained machine language instructions, any or all of which may be multi-dimensional (tensor) instructions. In particular embodiments, a full ML layer may be represented using one or more instructions in each of three classes of hardware instructions: compute instructions, non-linear (NLU) instructions, and direct memory access (DMA) instructions.

In particular embodiments, the compiler 610 may analyze a workload to be performed by the neural network and determine respective coarse-grained tensor instructions to be sent to each tensor processor cluster of ML accelerator 620 using a SIMD and/or single-program-multiple-data (SPMD) approach to distribute the workload. The compiler 610 may distribute the workload based on the architecture of the neural network, the number of tensor processor clusters, the number and processing capacity of the tensor processors in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processors, reduce the amount of data movement required between and within tensor processor clusters, and optimize resource utilization in ML accelerator 620. For example, compiler 610 knows what input features are to be processed by each coarse-grained instruction and determines how they should be partitioned between multiple tensor processor clusters of ML accelerator 620 and the tensor processors thereof. With this information, the compiler may then encode a "recipe" (including vector operations and addressing pattern) to be provided to each cluster to perform the coarse-grained instruction.

Figure 7A:
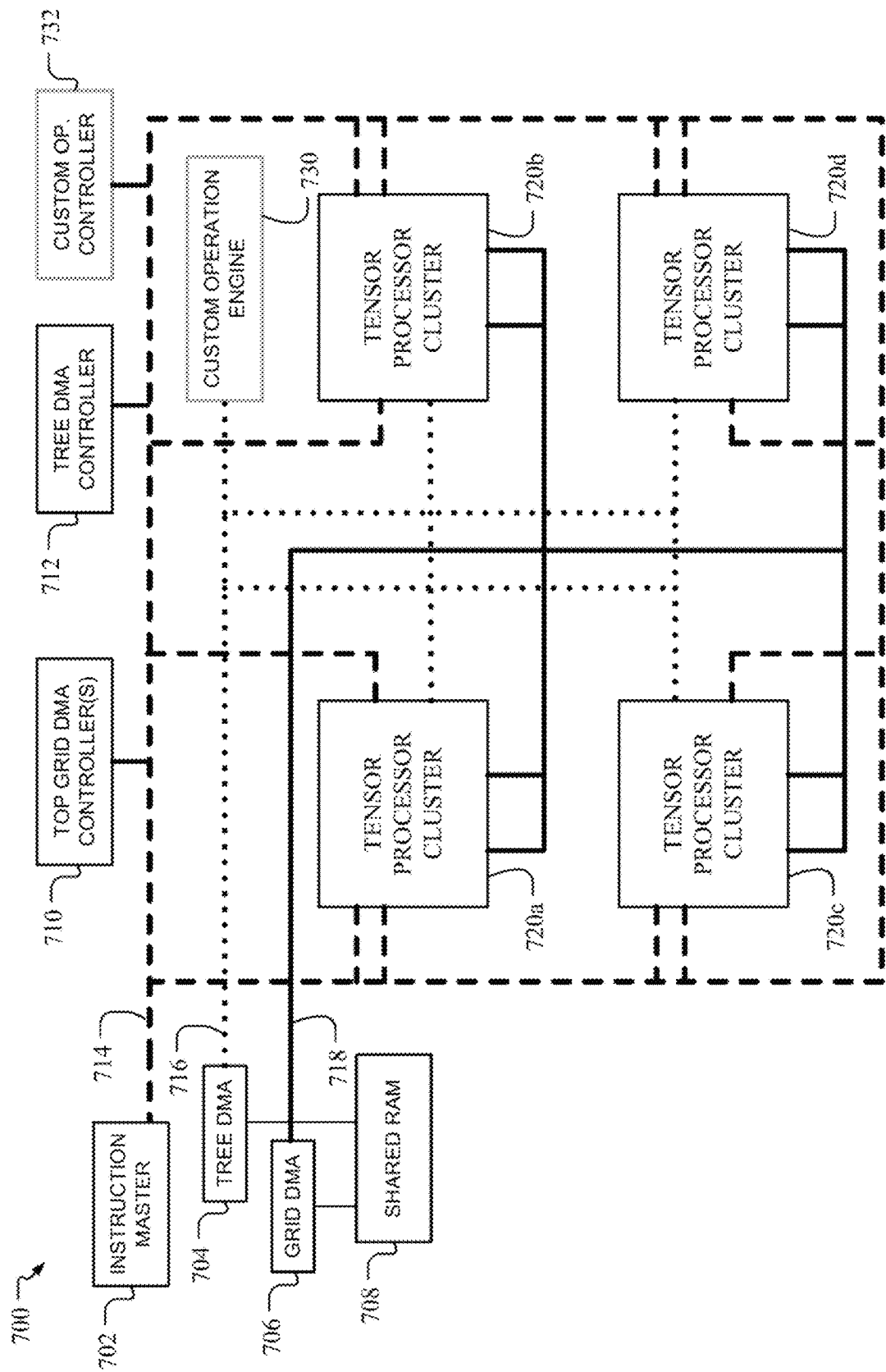
FIG. 7A illustrates selected elements of an example ML accelerator including multiple tensor processor clusters.
Figure 7B:
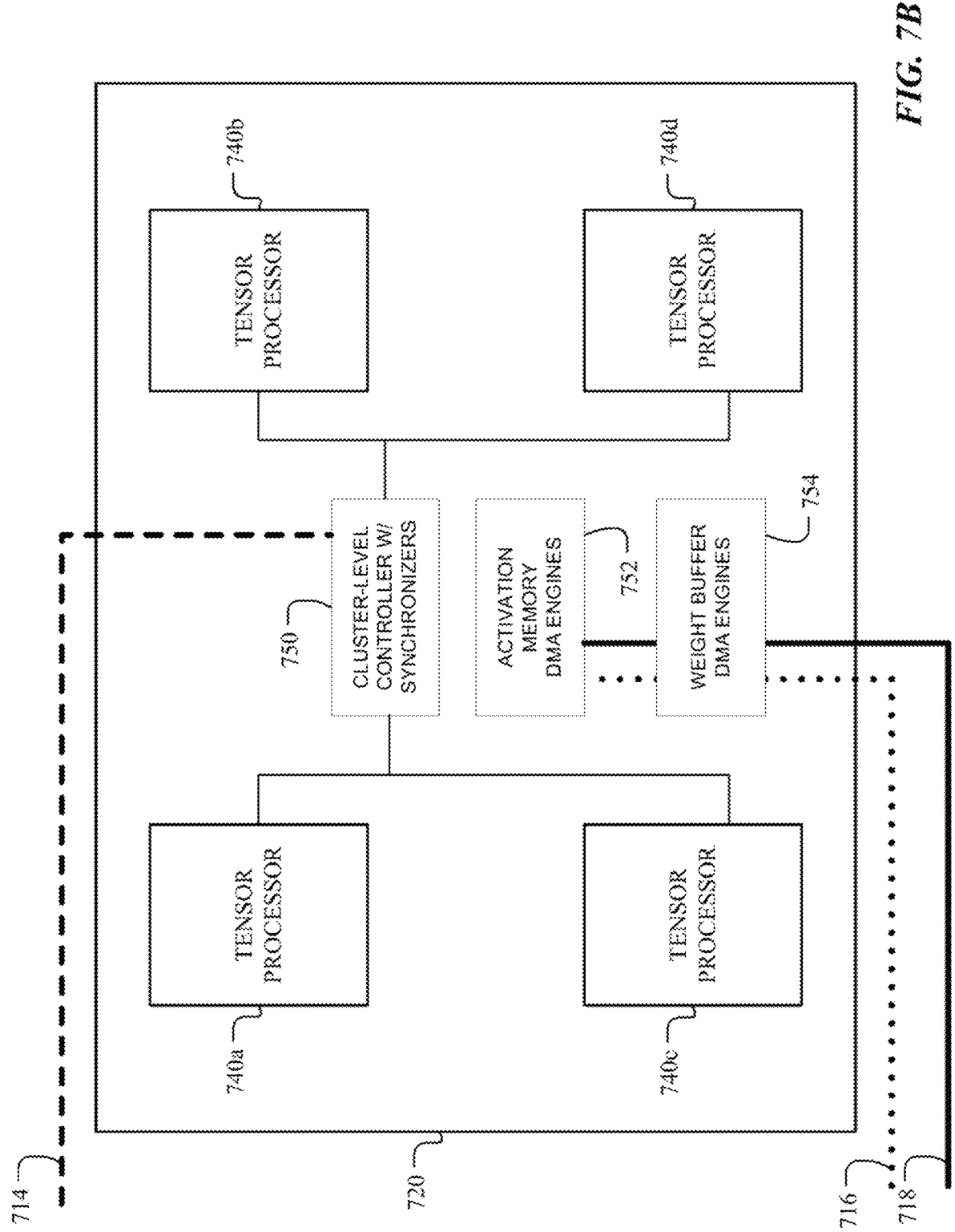
FIG. 7B illustrates selected elements of an example tensor processor cluster.
Figure 7C:
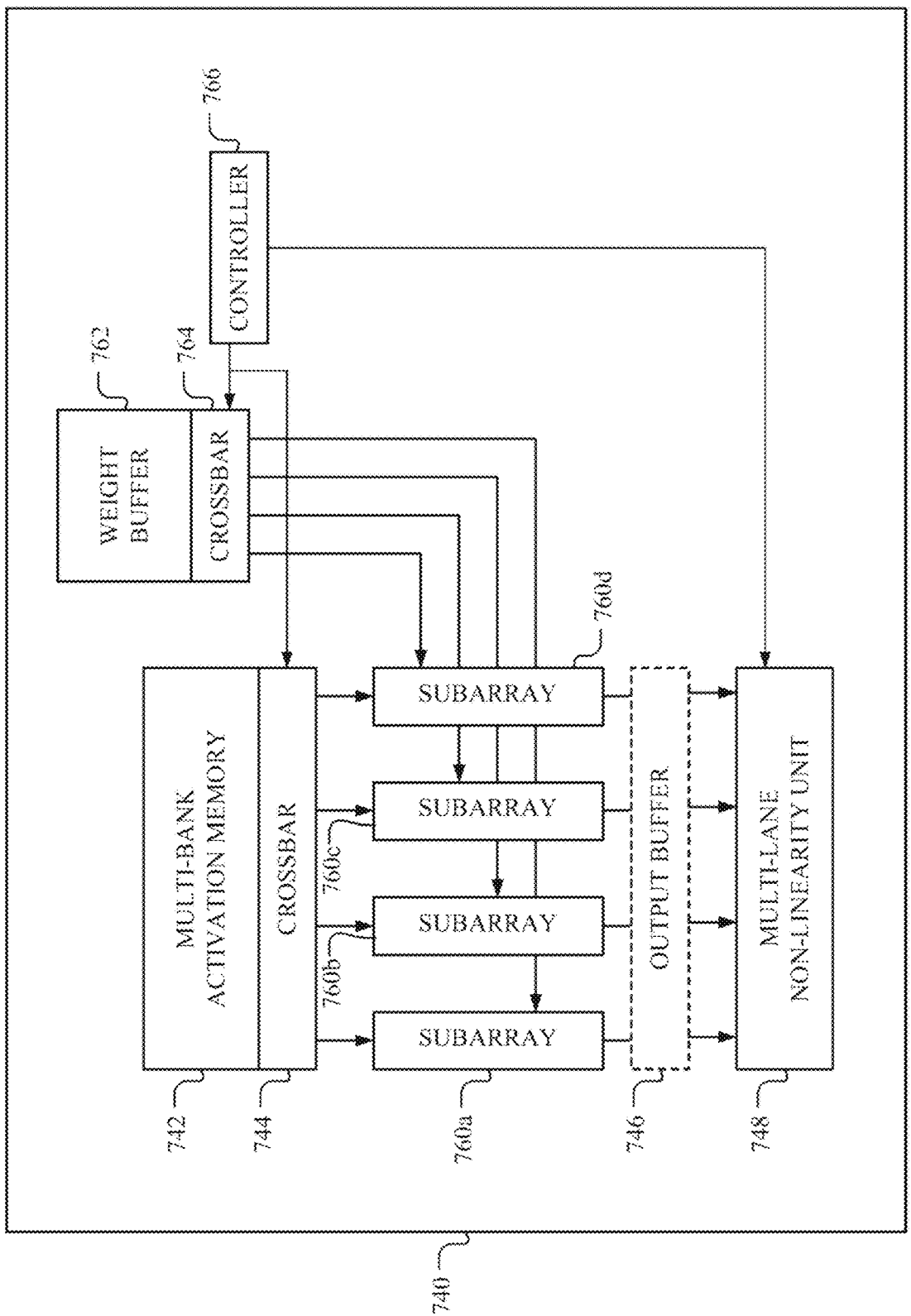
FIG. 7C illustrates selected elements of an example tensor processor.

FIGS. 7A through 7C illustrate selected elements of an example ML accelerator, such as an ML accelerator similar to ML accelerator 620 illustrated in FIG. 6, at different levels of the multi-level accelerator architecture. For example, FIG. 7A illustrates that an example ML accelerator 700 may include four tensor processor clusters 720 and may include, or be communicably coupled to, one or more top grid DMA controllers 710, a tree DMA controller 712, and/or an optional custom operation engine 730 and a corresponding optional custom operation controller 732. In other embodiments, ML accelerator 700 may include more or fewer than four tensor processor clusters 720. ML accelerator 700 may include, or be communicably coupled to, an instruction master 702, which may be communicatively coupled to each of the four tensor processor clusters 720, the top grid DMA controllers 710, and the tree DMA controller 712 over an instruction bus 714. ML accelerator 700 may also include a tree DMA 704 and a grid DMA 706, each of which is communicably coupled to a shared RAM 708. Tree DMA 704 may be communicably coupled to each of the four tensor processor clusters 720 and the optional custom operation engine 730 over tree DMA bus 716. Grid DMA 706 may be communicably coupled to each of the four tensor processor clusters 720 over grid DMA bus 718. In particular embodiments, ML accelerator 700 may also include a synchronization bus communicably coupled to the four tensor processor clusters 720, the top grid DMA controllers 710, the tree DMA controller 712, the optional custom operation engine 730 and corresponding optional custom operation controller 732, the instruction master 702, the tree DMA 704, the grid DMA 706, and/or the shared RAM 708, or any suitable subset thereof (not shown in FIG. 7A).

To support multiple tensor processor clusters processing input features in parallel, tree DMA controller 712 may distribute neural network weights (e.g., in packets) to tensor processor clusters 720 via tree DMA bus 716. The network topology in which the tree DMA controller 712 is communicatively coupled to each of the tensor processor clusters 720 may allow each tensor processor within a tensor processor cluster 720 to be communicatively coupled to the tree DMA controller 712 via a respective sub-branch of the tree DMA bus 716. Similarly, one or more top grid DMA controllers 710 may distribute activations to tensor processor clusters 720 via grid DMA bus 718. The network topology in which the grid DMA controller 710 is communicatively coupled to each of the tensor processor clusters 720 may allow each tensor processor within a tensor processor cluster 720 to be communicatively coupled to the grid DMA controller 710 via a respective sub-branch of the grid DMA bus 718. By structuring the tree DMA bus 716 and the grid DMA bus 718 according to a tree network topology (e.g., rather than a star or ring topology), the corresponding DMA controllers 712 and 710 may distribute neural network weights and activations to each tensor processor cluster 720 directly, thereby minimizing latency and overall power consumption. As such, the machine learning accelerator 700 may be suitable for AR/VR applications or other applications that require feature processing with minimal latency within a finite power budget.

FIG. 7B illustrates selected elements of an example tensor processor cluster 720, such as one of the four tensor processor clusters 720 of ML accelerator 700 illustrated in FIG. 7A. In this example, tensor processor cluster 720 includes four tensor processors 740, a shared cluster-level controller 750, one or more activation memory DMA engines 752, and one or more weight buffer DMA engines 754. In other embodiments, tensor processor cluster 720 may include more or fewer than four tensor processors 740. An example tensor processor 740 is illustrated in FIG. 7C and described below. The shared cluster-level controller 750 may interpret each coarse-grained tensor instruction received from a compiler, such as compiler 610 illustrated in FIG. 6, and translate it into a series of fine-grained tensor instructions that are multicast to the tensor processors in the tensor processor cluster tasked with performing the common series of operations. Each of these fine-grained tensor instructions may, for example, be a machine language instruction that represents a vector read operation, a vector write operation, a vector addition operation, or a vector multiplication operation to be performed by hardware compute arrays within each tensor processor or may represent a non-linear instruction to be applied to an intermediate output of the hardware compute arrays to produce an element of an output feature set. The shared cluster-level controller 750 may include synchronizers that synchronize the operations of the tensor processors within the cluster so that they perform the common series of operations in parallel and in lockstep. For example, one or more synchronizers may maintain the state of the control loops across all tensor processors to ensure there are no data hazards between producers and consumers of particular features. The shared cluster-level controller 750 may ensure that the appropriate subsets of the input feature set and the weights to be applied for each operation have been loaded into the local memories for each tensor processor. This may include generating an address pattern for the weights, generating an address pattern for the input activations, and generating an address pattern for the outputs of the common series of operations.

The cluster-level controller 750 receives tensor instructions, e.g., coarse-grained tensor instructions, over instruction bus 714. Each coarse-grained tensor instruction sent to a tensor processor cluster 620 may encode information usable by the cluster to perform a multi-cycle operation corresponding to a part of a single neural network layer. For example, compiler 610 may generate a respective "recipe" for each layer in a convolutional neural network. In one example, using a SPMD approach, the compiler 610 may distribute the workload such that different tasks are assigned to different tensor processor clusters 620 with some or all of the tensor processor clusters 620 operating on the same input feature set. Using this approach, the tensor processor clusters 620 may operate in parallel but may typically not operate in lockstep with each other. In another example, using a SIMD approach, the compiler 610 may distribute the workload such that the same tasks are assigned to multiple tensor processor clusters 620 and such that each of those multiple tensor processor clusters 620 operates on different data, such as on a different subset of an input feature set for the neural network. In one example, the compiler 610 may assign one quarter of an input feature set representing an image to each of four tensor processor clusters 620 for processing, and each of the four tensor processors 740 in each tensor cluster 620 may operate on one-quarter of the input features allocated to the tensor processor cluster 620 by the compiler. Using this approach, the tensor processor clusters 620 may operate in parallel and may typically, but not necessarily, operate in lockstep with each other. By contrast, within a tensor processor cluster 620, the operations of the tensor processors 740 of the cluster may always be performed in parallel and in lockstep.

In particular embodiments, the activation memory DMA engines 752 and weight buffer DMA engines 754 are communicably coupled to a grid DMA and a tree DMA, such as those illustrated in FIG. 7A, over grid DMA bus 718 and tree DMA bus 716, respectively, to provide the appropriate weights and input features to each tensor processor 740 in each cycle. In the example tensor processor cluster 620, each of the four tensor processors 740 may operate on one-quarter of the input features allocated to tensor processor cluster 620 by the compiler, as provided by the activation memory DMA engines 752. In particular embodiments, activation memory DMA engines 752 and the synchronizers within cluster-level controller 750 may make it possible to share edge pixels between layers. For example, activation memory DMA engines 752 may be coupled with the synchronizers to help move output edge pixels from the activation memories of particular tensor processors 740 to the activation memories of other tensor processors 740 for computing the next layer output. In some cases, such as when the dimensions of the output feature map are different than the dimensions of the input feature map for the next layer, each tensor processor may require output features generated by more than one tensor processor as input features for computing the next layer output. In particular embodiments, the synchronizers may schedule DMA operations to move the data based on information encoded in the multi-cycle instructions by the compiler and received by cluster-level controller 750.

Because the tensor processors within a given tensor processor operate in parallel and lock step to perform the same sequence of vector operations in accordance with a common recipe, each tensor processor may be configured to perform the same amount of work. However, the amount of work to be done, collectively, by the tensor processors might not be divisible across the tensor processors in a way that utilizes all of the available computing resources in the tensor processors. In particular embodiments, the compiler may "round up" the amount of work allocated to each tensor processor cluster to match the number and dimensions of the tensor processors and MAC computation units thereof, such as by zero padding the spatial partition of the input feature map provided to the cluster to maintain symmetry between the tensor processors. The zero padding may be applied by the complier at different levels of the multi-level control architecture, in different embodiments. In one example, if a given cluster is to compute a 3×3 output tensor and the cluster includes four tensor processors, the compiler may apply zero padding to the respective spatial partition of the input tensor assigned to the cluster in the x and y dimensions such that the computation generates a 4×4 output tensor that is divisible across the four tensor processors, portions of which may be discarded or ignored. In another example, zero padding may be applied at a lower level of the multi-level control architecture. For example, a particular tensor processor may be configured to generate outputs in 32 channels, but the convolution operation to be performed by the tensor processor may produce an output tensor having only 30 channels. In this example, the compiler may apply zero padding to expand the dimensions of the computation to match the dimensions of the output tensor.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processors described in this application addresses this problem using flexible hardware resources and flexible computation-to-hardware mapping. For example, FIG. 7C illustrates selected elements of an example tensor processor 740, such as one of the four tensor processors 740 of tensor processor cluster 720 illustrated in FIG. 7B. In particular embodiments, tensor processor 740 is implemented with a flexible architecture in which computation components are organized such that the tensor processor can support a variety of convolutional layer shapes with high resource utilization and high reuse of locally available data. The tensor processor 740 may be a single-instruction-multiple-data (SIMD) machine that includes a compute array capable of performing vector operations that collectively implement higher-level tensor instructions using data parallelism or model parallelism in a neural network. In this example, tensor processor 740 includes a multi-bank activation memory 742, a first crossbar 744, four compute subarrays 760, an optional output buffer 746, a multi-lane non-linearity unit 748, a weight buffer 762, e.g., a register file storing weights, a second crossbar 764, and a local controller 766. In other embodiments, tensor processor 740 may include more or fewer than four subarrays 760. In particular embodiments, tensor processor 740 may, during operation, be dynamically configured to perform convolution operations of different sizes and shapes by controlling the size and shape of the input feature map data and weights supplied to each of the subarrays 760 and MAC computation units thereof using the flexible crossbars 744 and 764 and by controlling the reduction and/or combination of the outputs of the each of the subarrays 760 and MAC computation units thereof to generate an output feature map of a desired size and shape. In particular embodiments, tensor processor 740 may also be configured to perform group convolution operations in which not all output elements depend on the same input elements or weights.

In the illustrated example, multi-bank activation memory 742 includes local memory elements that store the input feature map elements to be provided to various ones of the subarrays 760. The first crossbar 744 is a first flexible many-to-many crossbar that reads input feature map elements (e.g., pixel values) from multi-bank activation memory 742 and provides them to the appropriate subarrays 760 in each cycle. In the illustrated example, weight buffer 762, which may be implemented as a register file, includes local memory elements that store the filter weights to be provided to various ones of the subarrays 760. The second crossbar 764 is another flexible crossbar that loads filter weights from weight buffer 762 and provides them to the appropriate subarrays 760 in each cycle. In particular embodiments, results of the operations (e.g., output feature elements) may be written back into multi-bank activation memory 742 from which they may be provided as inputs to various subarrays 760 of the same tensor processor 740 or a different tensor processor 740 in a subsequent cycle (e.g., for a different layer in the convolutional neural network) and/or for a subsequent vector operation of current cycle. In other words, activation memory 742 may be a shared memory that, at various times, stores input activations and/or output activations associated with various convolution operations that have been performed by, or are to be performed by, the subarrays 760 of the tensor processor 740. As discussed above in reference to activation memory DMA engines 752, the output feature set for a given layer might have different dimensions and/or be distributed differently than the input feature set for the next layer. In particular embodiments, the merging of results generated by the subarrays 760 may be performed in the shared memory.

In particular embodiments, each of the four compute subarrays 760 includes an array of multiply-and-accumulate (MAC) computation units of a given size that operate in parallel to apply the weights defined for a given 2D kernel of a given 3D convolution filter to portions of an input feature map and produce portions of an output feature map. In one example, each of the four compute subarrays 760 may include 64 MAC computation units organized as an 8×8 array, for a total of 256 MAC computation units in tensor processor 740. In this example, each of the four compute subarrays 760 may produce 8 output feature elements, for a total of 32 output feature elements produced by tensor processor 740. In other embodiments, the subarrays 760 of a particular tensor processor 740 may include more or fewer than 64 MAC computation units organized as 2D arrays of a size other than 8×8. The output feature map may have a different shape than the input feature map. A local controller 766 within tensor processor 740 may, e.g., in conjunction with a shared cluster-level controller, such as shared cluster-level controller 750 illustrated in FIG. 7B, control the operation of the crossbars 744 and 764 and the flexible reduction module or multi-lane non-linearity unit 748, in accordance with the coarse-grained tensor instructions received from compiler 610 illustrated in FIG. 6 and/or fine-grained instructions received from the shared cluster-level controller 750.

In particular embodiments, the optional output buffer 746 stores intermediate outputs from one or more subarrays 760 such that partial results may be accumulated prior to passing them through a reduction module, thus reducing the scope and/or complexity of the reduction operation. In particular embodiments, the multi-lane non-linearity unit 748 is a flexible reduction module configurable to take an intermediate computation output from the subarrays 760 and perform a reduction (i.e., addition) of subarray outputs to produce an output for tensor processor 740 as a whole, where appropriate. In this example, the tensor processor 740 would not only perform the MAC operations of a given convolution operation, but may also execute non-linear instructions, as needed, for the particular machine learning program. In one example, the non-linearity unit 748 may apply functions such as Relu to the sum of the outputs of multiple subarrays 760 and write the result into the shared multi-bank activation memory 742.

Each of the coarse-grained tensor instructions received by a tensor processor cluster may encode information usable by its shared controller to determine the subset of the input feature set on which each tensor processor within the cluster is to operate (each tensor processor being tasked with generating an assigned spatial partition of the output tensor based on the assigned subset of input feature set), the common series of operations to be performed by all of the tensor processors within the cluster, the weights to be applied to the subset of the input feature set for each of the operations within the common series of operations, and any non-linear operations that are to be applied to the subset of the input feature set as part of a multi-cycle operation corresponding to a single neural network layer. For example, the computations for generating the next-layer output may be spatially partitioned equally across a 2D array of tensor processors within the tensor processor cluster in the x and y dimensions.

In one example, a coarse-grained tensor instruction may represent a nested loop that iterates over x, y, and/or z dimensions of the respective subsets of the input feature set on which each tensor processor cluster and tensor processor thereof is to operate to produce an output feature set having the same or different dimensions as the input feature set. In particular embodiments, the tensor processors operate in controlled lock steps, such that the local x and y loops performed by the hardware compute arrays of each tensor processor share the same addressing patterns (e.g., the same address offsets) relative to its local base address. This, in turn, may allow the control logic to be identical and shared between the hardware compute arrays of the tensor processors. Similarly, due to spatial partitioning and the operation of the tensor processors in controlled lock steps, the hardware compute arrays of the tensor processors apply identical weights in each cycle. This, in turn, may allow the weight buffer to be read once per cycle and the weights to be broadcast to the tensor processors.

For example, a tensor processor may compute multiple output tensors of an output feature map by performing, for each element of each output tensor, multiple MAC operations between elements of an input tensor and applicable neural network weights. In one example, the input feature map allocated to a tensor processor cluster, which includes multiple input tensors, may represent an input image, or portion thereof assigned to the tensor processor cluster, of height H (in the y dimension) and width W (in the x dimension). A cluster-level coarse-grained instruction may be a nested loop to iterate over the x and y input feature dimensions and the kx and ky filter kernel dimensions, over Zin input features to generate a multi-dimensional output tensor in dimensions x, y and zo, as follows:

```
for x 0:W
  for y 0:H
    for zo in 0:Zo
      for kx
        for ky
          for zin in 0:Zin
            output[x][y][zo] += input[x+kx][y+ky][zin] *
            weights[kx][ky][zin][zo].
```

The second level of SIMD operation, in this example, may be achieved by computing multiple outputs zo in a single instruction iteration in parallel using respective ones of the MAC computation units in the compute arrays and subarrays of each tensor processor in the cluster. In this way, multiple z0 dimension outputs may be computed as a vector, as follows:

```
for x 0:W
    for y 0:H
        for kx
            for ky
                for Zin
                    output[x][y][o:Zo] += input[x+kx][y+ky][zin] *
                        weights[kx][ky][zin][0:Zo].
```

In the example ML accelerator embodiment illustrated in FIG. 7B, tensor processor 740*a* may operate on input features representing a top left quarter of the input image, or a portion thereof assigned to tensor processor cluster 720, as follows:

```
for x 0:W/2
    for y 0:H/2
        for kx
            for ky
                for Zin
                    output[x][y][o:Zo] += input[x+kx][y+ky][zin] *
                        weights[kx][ky][zin][0:Zo].
```

In this example, tensor processor 740*b* may operate on input features representing a top right quarter of the input image, or the portion thereof assigned to tensor processor cluster 720, as follows:

```
for x W/2+1:W−1
    for y 0:H/2
        for kx
            for ky
                for Zin
                    output[x][y][o:Zo] += input[x+kx][y+ky][zin] *
                        weights[kx][ky][zin][0:Zo].
```

In this example, tensor processor 740*c* may operate on input features representing a bottom left quarter of the input image, or the portion thereof assigned to tensor processor cluster 720, as follows:

```
for x 0:W/2
    for y H/2+1:H−1
        for kx
            for ky
                for Zin
                    output[x][y][o:Zo] += input[x+kx][y+ky][zin] *
                        weights[kx][ky][zin][0:Zo].
```

In this example, tensor processor 740*d* may operate on input features representing a bottom right quarter of the input image, or the portion thereof assigned to tensor processor cluster 720, as follows:

```
for x W/2+1:W−1
    for y H/2+1:H−1
        for kx
            for ky
                for Zin
                    output[x][y][o:Zo] += input[x+kx][y+ky][zin] *
                        weights[kx][ky][zin][0:Zo].
```

In this example, the local x and y loops performed by each tensor processor may use the same "recipe" including the same offset relative to a different base address to access the required input features, where w=W/2 and h=H/2, as follows:

```
for x 0:w
    for y 0:h
        for kx
            for ky
                for Zin
                    output[x][y][o:Zo] += input[x+kx][y+ky][zin] *
                        weights[kx][ky][zin][0:Zo].
```

As illustrated in this example, when a tensor processor cluster implements data parallelism, all of the tensor processors within the cluster may perform the same common series of operations using the same weights, but each tensor processor in the cluster may operate on a different subset of the input feature set to produce a subset of an output feature set having the same output format and output dimensions. Using this approach, the fine-grained machine language instructions broadcast to all tensor processors in the cluster may be the same and they may access and apply the same sets of weights at each step. The fine-grained machine language instructions may be expressed in terms of addresses relative to particular base addresses in one or more dimensions and these base addresses may be different from each other to identify the appropriate subsets of the input feature set on which each tensor processor is to operate.

When a tensor processor cluster implements model parallelism, all of the tensor processors within the cluster may perform the same common series of operations on the same subset of the input feature set, but each of the tensor processors in the cluster may apply a different set of weights to those operations to produce a respective subset of an output feature set. Using this approach, the fine-grained machine language instructions broadcast to all tensor processors in the cluster may be the same and they may access and operate on the same subset of the input feature set but, at each step, each tensor processor may access and apply a different set of weights than the other tensor processors in the cluster.

Before broadcasting a fine-grained tensor instruction corresponding to one of the operations in the common series of operations to be performed by the tensor processors within a tensor processor cluster, the shared controller of the tensor processor cluster may ensure that the appropriate subsets of the input feature set and the weights to be applied for that operation have been loaded into the local memories for each tensor processor. This may include loading multiple sets of weights to be applied by respective operations in the common series of operations prior to initiating the operation of the first of the operations in the series. Once all of the tensor processors have local access to their respective subsets of the input feature set and the appropriate weights to be applied, the shared controller may broadcast the fine-grained machine language instruction for the upcoming operation. Similarly, before initiating the performance of a second common series of operations corresponding to a second coarse-grained tensor instruction, the shared controller may ensure that the appropriate subsets of the input feature set and the weights to be applied by the operations in the second common series of operations have been loaded into the local memories for each tensor processor. This may include initiating one or more direct memory access (DMA) transfers between the memories in multiple tensor processors within the cluster if performing the second common series of operations necessitates the redistribution of elements of the subsets of the output feature set produced by the tensor processors in the previous operation to serve as appropriate subsets of an input feature set for the upcoming operations, such as when the dimensions of the input feature set for the second common series of operations are different than the dimensions of the output feature set produced by the previous common series of operations.

Figure 8:
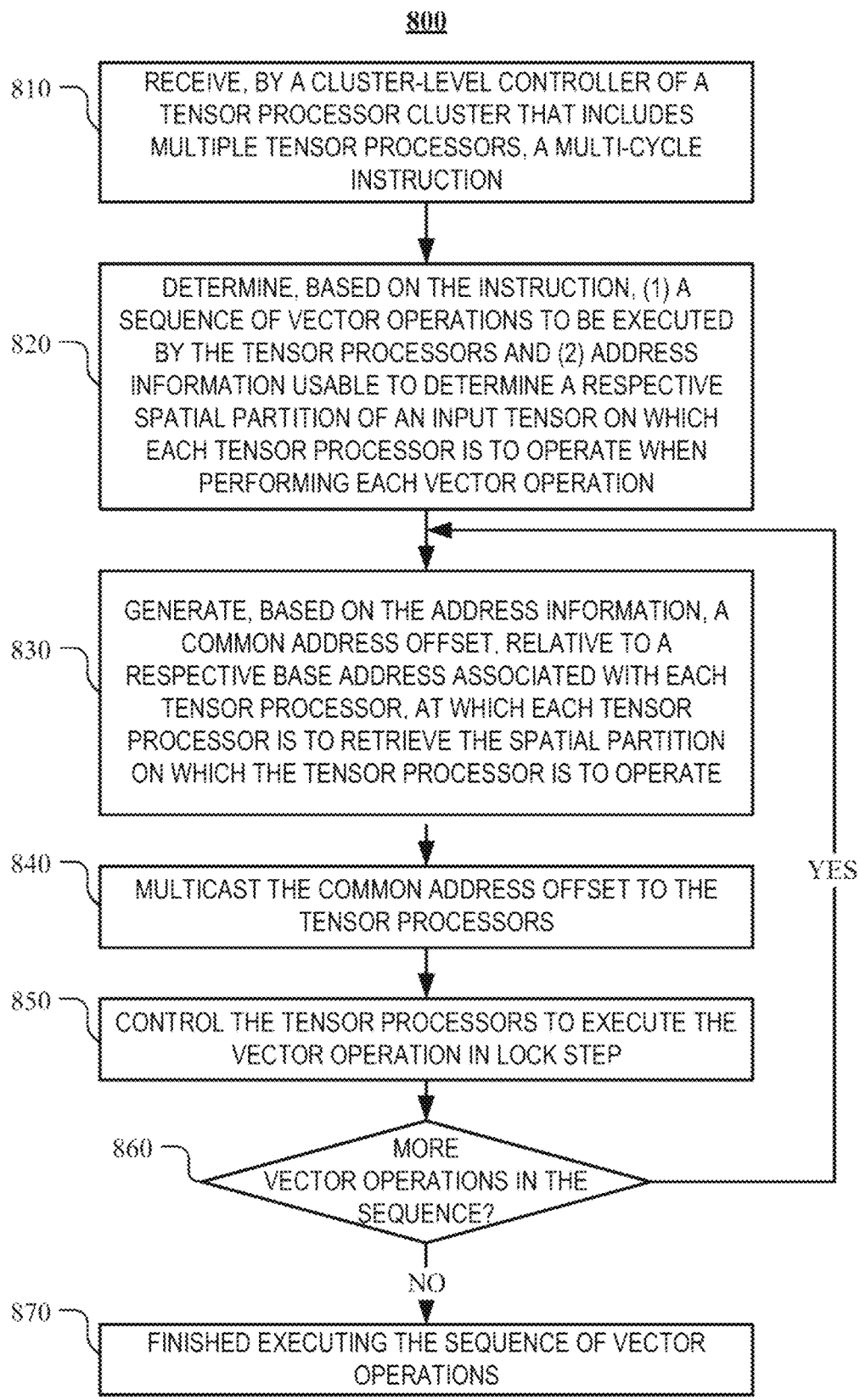
FIG. 8 illustrates an example method for machine learning acceleration using a multi-level control architecture.

FIG. 8 illustrates an example method 800 for machine learning acceleration using a multi-level control architecture. In various embodiments, some or all of the operations shown in FIG. 8 may be performed by a shared cluster-level controller such as cluster-level controller 750 illustrated in FIG. 7B. The method may begin at step 810, where a cluster-level controller of a tensor processor cluster that includes multiple tensor processors receives a multi-cycle instruction, such as a coarse-grained vector instruction.

In particular embodiments, the multi-cycle instruction received by the tensor processor cluster controller represents a portion of a machine-learning program that includes many such multi-cycle instructions, each of which is associated with one or more convolution operations to be performed in a respective layer in a convolutional neural network. In particular embodiments, the respective spatial partitions of an input tensor on which each tensor processor in the cluster is to operate are subsets of an input feature map. In particular embodiments, respective multi-cycle instructions may be distributed across multiple tensor processor clusters in accordance with SIMD parallelism such that at least two of the clusters receive and execute the same multi-cycle instruction while operating on a different subset of the input feature map, and these clusters operate in parallel and in lock step to execute the same multi-cycle instruction. In particular embodiments, respective multi-cycle instructions may be distributed across multiple tensor processor clusters in accordance with SPMD parallelism such that at least two of the clusters receive and execute different multi-cycle instructions while operating on the input feature set.

At step 820, the method may include determining, based on the received multi-cycle instruction, (1) a sequence of vector operations to be executed by the tensor processors and (2) address information usable to determine the respective spatial partition of the input tensor on which each tensor processor is to operate when performing each vector operation. For example, the multi-cycle instruction may encode a "recipe" identifying the sequence of vector operations and the addressing patterns for accessing the appropriate input features for each vector operation in the sequence.

At step 830, the method may include generating, based on the address information, a common address offset, relative to a respective base address associated with each tensor processor, at which each tensor processor is to retrieve the spatial partition on which the tensor processor is to operate to perform a given one of the vector operations in the sequence of operations. For example, the shared cluster-level controller may use the recipe encoded in the multi-cycle instruction to generate scalar addresses for the input tensors (activation addresses) and output tensor (output address) for each of the vector operations in the sequence.

At step 840, the method may include the shared cluster-level controller multicasting the generated common address offset to the tensor processors.

At step 850, the method may include the shared cluster-level controller controlling the tensor processors to execute the vector operation in lock step. For example, one or more synchronizers of the shared cluster-level controller may maintain the state of the control loops across the tensor processors to ensure there are no data hazards between producers and consumers of particular features. The shared cluster-level controller may also ensure that the appropriate subsets of the input feature set for the vector operation has been loaded into the local memories for each tensor processor prior to execution. In this example, each tensor processor in the cluster is configured to generate a respective spatial partition of an output tensor based on the respective spatial partition of the input tensor on which each tensor processor in the cluster operates using SIMD parallelism. More specifically, each tensor processor in the cluster is configured to implement data parallelism, in this example.

If, at step 860, there are more vector operations in the sequence of operations that have not yet been performed, the method may return to 830 where the operations shown as 830-860 are repeated for each additional vector operation in the sequence. Otherwise, execution of the sequence of vector operations is complete, as shown at 870.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for machine learning acceleration using a multi-level control architecture including the particular steps of the method of FIG. 8, this disclosure contemplates any suitable method for machine learning acceleration using a multi-level control architecture including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8. For example, in particular embodiments, one or more of the operations shown in FIG. 8 may be performed by a local controller within a tensor processor, such as controller 766 illustrated in FIG. 7C, instead of or in conjunction with a shared cluster-level controller.

Figure 9:
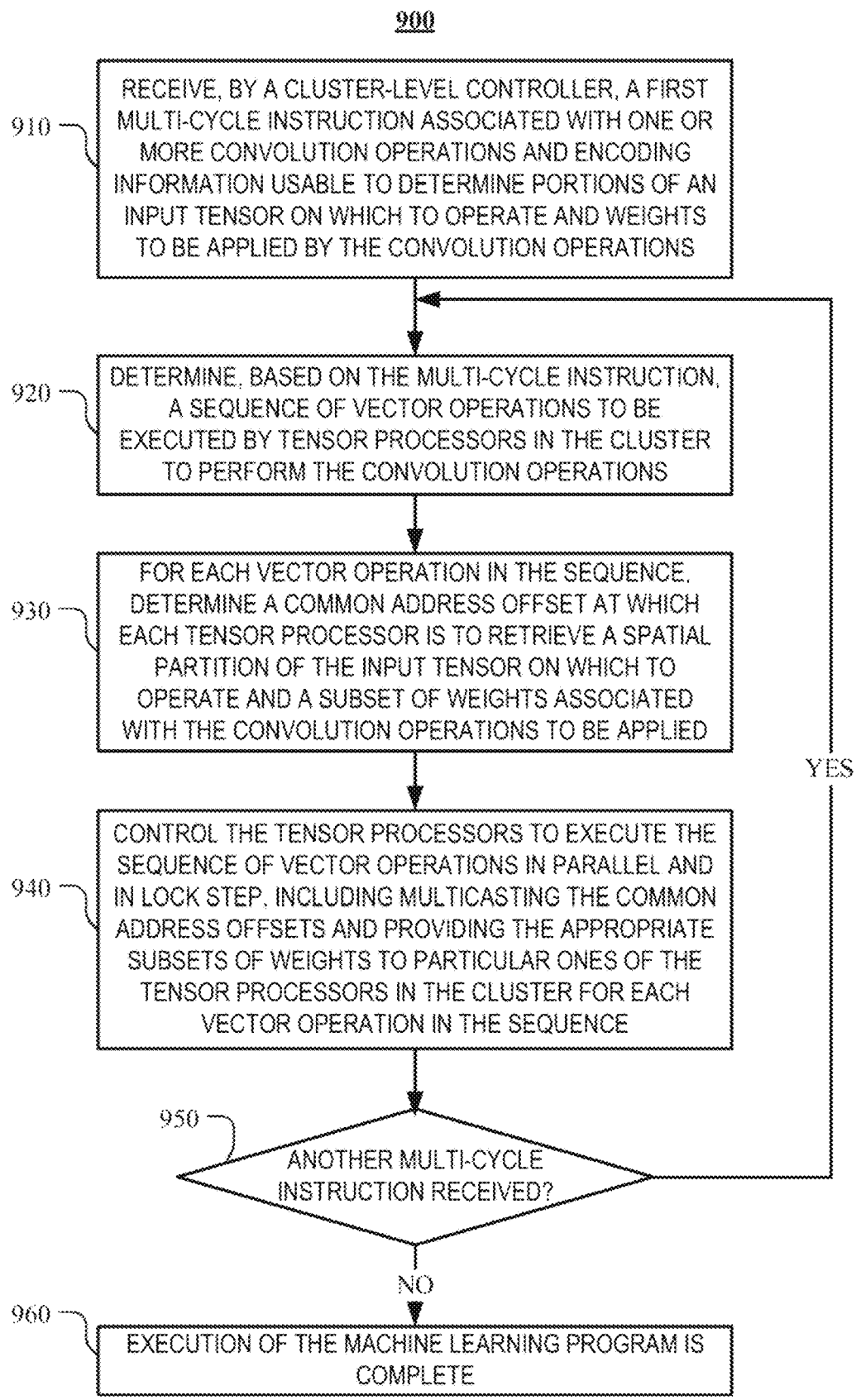
FIG. 9 illustrates an example method for machine learning acceleration in a convolutional neural network.

FIG. 9 illustrates an example method 900 for machine learning acceleration in a convolutional neural network. In various embodiments, some or all of the operations shown in FIG. 9 may be performed by a shared cluster-level controller such as cluster-level controller 750 illustrated in FIG. 7B. The method may begin at step 910, where a shared cluster-level controller receives a first multi-cycle instruction, such as a coarse-grained vector instruction, that is associated with one or more convolution operations and that encodes information usable to determine portions of an input tensor on which to operate and weights to be applied by the convolution operations. The shared cluster-level controller may be a controller in a given one of multiple tensor processor clusters in of an ML accelerator. The first multi-cycle instruction may represent a portion of a machine-learning program that includes many such multi-cycle instructions, each of which is associated with one or more convolution operations to be performed in a respective layer in a convolutional neural network. For example, a first cycle of the first multi-cycle instruction may be associated with a first convolution operation. In particular embodiments, the respective spatial partitions of an input tensor on which each tensor processor in the cluster is to operate are subsets of an input feature map. In particular embodiments, respective multi-cycle instructions may be distributed across multiple tensor processor clusters in accordance with SIMD parallelism such that at least two of the clusters receive and execute the same multi-cycle instruction while operating on a different subset of the input feature map, and these clusters operate in parallel and in lock step to execute the same multi-cycle instruction. In particular embodiments, respective multi-cycle instructions may be distributed across multiple tensor processor clusters in accordance with SPMD parallelism such that at least two of the clusters receive and execute different multi-cycle instructions while operating on the input feature set.

At step 920, the method may include determining, based on the first multi-cycle instruction, a sequence of vector operations to be executed by tensor processors in the cluster to perform the convolution operations associated with the first multi-cycle instruction. For example, the multi-cycle instruction may encode a "recipe" identifying the sequence of vector operations and the addressing patterns for accessing the appropriate input features and weights for each vector operation in the sequence.

At step 930, the method may include, for each vector operation in the sequence of vector operations, determining a common address offset at which each tensor processor is to retrieve a spatial partition of the input tensor on which to operate and a subset of weights associated with the convolution operations to be applied to the spatial partition of the input tensor. For example, the shared cluster-level controller may use the recipe encoded in the multi-cycle instruction to generate scalar addresses for the input tensors (activation addresses), weight tensors (weight addresses), and output tensor (output address) for each of the vector operations in the sequence.

At step 940, the method may include the shared cluster-level controller controlling the tensor processors to execute the sequence of vector operations in parallel and in lock step. This may include multicasting the common address offsets and providing the appropriate subsets of weights to particular ones of the tensor processors in the cluster for each vector operation in the sequence. To control the tensor processors, one or more synchronizers of the shared cluster-level controller may maintain the state of the control loops across the tensor processors to ensure there are no data hazards between producers and consumers of particular features. Controlling the tensor processors may also include the shared cluster-level controller ensuring that the appropriate subsets of the input feature set and the weights to be applied for the vector operation have been loaded into the local memories for each tensor processor prior to execution. In this example, each tensor processor in the cluster is configured to generate a respective spatial partition of an output tensor based on the respective spatial partition of the input tensor on which each tensor processor in the cluster operates using SIMD parallelism. More specifically, each tensor processor in the cluster is configured to implement data parallelism. In this example, the shared cluster-level controller may provide a first subset of the weights that are associated with the first convolution operation to the hardware compute arrays of two or more of the tensor processors in the given cluster for execution of the first convolution operation in the first cycle of the first multi-cycle instruction.

In particular embodiments, method 900 may include the shared cluster-level controller determining, for at least one vector operation in the sequence of vector operations and dependent on weight information encoded in the first multi-cycle instruction, a second subset of the weights associated with the first multi-cycle instruction that are associated with the first convolution operation and providing the second subset of the weights that are associated with the first convolution operation to the hardware compute array of one of the tensor processors in the given cluster other than the tensor processors that received the first subset of weights for execution of the first convolution operation in the first cycle of the first multi-cycle instruction.

In particular embodiments, a second cycle of the first multi-cycle instruction may be associated with a second convolution operation, and method 900 may include the shared cluster-level controller determining, for at least one vector operation in the sequence of vector operations and dependent on weight information encoded in the first multi-cycle instruction, a second subset of the weights associated with the first multi-cycle instruction that are associated with the second convolution operation, and providing the second subset of the weights to the hardware compute arrays of the tensor processors that received the first subset of weights for execution of the second convolution operation in the second cycle of the first multi-cycle instruction.

In various embodiments, any suitable subsets of weights and combinations of such subsets of weights may be provided to particular ones of the tensor processors for execution of the particular convolution operations associated with the first multi-cycle instruction.

If, at step 950, another multi-cycle instruction is received, the method may return to 920 where the operations shown as 920 through 950 are repeated for each additional multi-cycle instruction. Otherwise, execution of the machine learning program is complete, as shown at 960. For example, in particular embodiments, the method may include receiving (at 910) a second multi-cycle instruction determining (at 920), based on the second multi-cycle instruction, a second sequence of vector operations to be executed by the tensor processors in the given cluster and, for each vector operation in the second sequence of vector operations, generating, based on address information encoded in the second multi-cycle instruction, a common address offset, relative to a respective base address associated with each tensor processor in the given cluster, at which each tensor processor is to retrieve the respective spatial partition of the input tensor on which the tensor processor is to operate, and (at 940) controlling the tensor processors in the given cluster to execute the vector operation in lock step, including multicasting the common address offset to the tensor processors in the given cluster.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for machine learning acceleration in a convolutional neural network including the particular steps of the method of FIG. 9, this disclosure contemplates any suitable method for machine learning acceleration in a convolutional neural network including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9. For example, in particular embodiments, one or more of the operations shown in FIG. 9 may be performed by a local controller within a tensor processor, such as controller 766 illustrated in FIG. 7C, instead of or in conjunction with a shared cluster-level controller.

The machine learning accelerators described herein, and the multi-level control architecture thereof, may provide technical advantages when compared to existing machine learning accelerators. These advantages may include energy savings due to convolution kernel weights being fetched from external memory once and being reused multiple times in each cycle of a multi-cycle instruction, as well as energy savings due to data movement being more localized. Each hardware compute array may be independently optimized during place-and-route (PnR) leading to even greater energy savings. While the example ML accelerators described herein are relatively small, e.g., with 256 MAC computation units in each of four tensor processors within each of four tensor processor clusters, the multi-level control architecture described herein is scalable for larger problem spaces in the x and/or y dimensions. Compared to ML accelerators that apply scaling in the channel dimension, scaling in the x and/or y dimensions may allow for the use of smaller sized weight buffers within the tensor processors. In addition, the multi-level control architecture and techniques described herein may facilitate relatively simple scaling of the compiler when the hardware components of the ML accelerator are scaled up.

Figure 10:
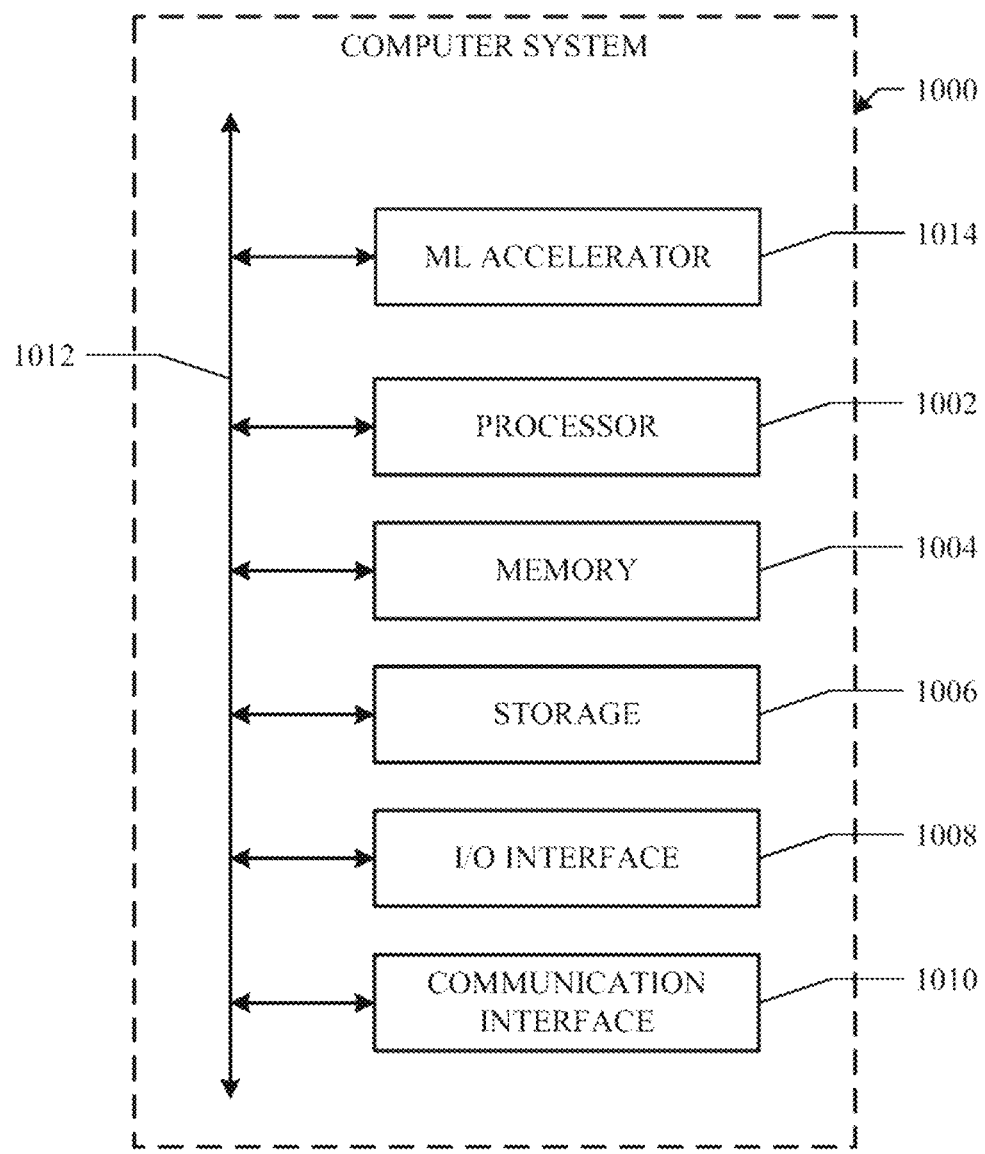
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an AR/VR reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, a bus 1012, and an ML accelerator 1014. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, ML accelerator 1014 may be similar to ML accelerator 620 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1014, as described herein. In particular embodiments, ML accelerator 1014 may be implemented using hardware and/or software elements in any suitable combination. As described herein, ML accelerator 1014 may include multiple tensor processor clusters and underlying tensor processors, each of which may include local memory for storing input features, weights for 2D kernels of various multi-dimensional filters, and/or output features of various convolution operations (not shown in FIG. 10). In particular embodiments, these local memories may be loaded from storage 1006, memory 1004, or from another source (such as, for example, another computer system 1000). The use of ML accelerator 1014 to execute the tensor instructions may improve the overall performance and resource utilization of computer system 1000 for those applications when compared to executing them using processor 1002 or using an existing ML accelerator.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for machine learning acceleration, comprising:
   a plurality of tensor processor clusters, each comprising:
   a plurality of tensor processors; and
   a cluster-level controller configured to:
      receive a multi-cycle instruction, wherein each of the plurality of tensor processor clusters receives a respective multi-cycle instruction, and wherein the respective multi-cycle instructions are distributed across the plurality of tensor processor clusters in accordance with single-program-multiple-data (SPMD) parallelism such that at least two of the plurality of tensor processor clusters receive and execute different multi-cycle instructions while operating on an input feature map;
      determine, based on the multi-cycle instruction, (1) a sequence of vector operations to be executed by the tensor processors and (2) address information usable to determine a respective spatial partition of an input tensor on which each tensor processor is to operate when performing each vector operation; and
      for each vector operation in the sequence:
         generate, based on the address information, a common address offset, relative to a respective base address associated with each tensor processor, at which each tensor processor is to retrieve the respective spatial partition of the input tensor on which the tensor processor is to operate;
         multicast the common address offset to the tensor processors; and
         control the tensor processors to execute the vector operation in lock step.

2. The system of claim 1, wherein:
   a first multi-cycle instruction received by a given one of the plurality of tensor processor clusters represents a portion of a machine-learning program;
   the machine-learning program comprises a plurality of multi-cycle instructions, each of which is associated with one or more convolution operations to be performed in a respective layer in a convolutional neural network; and
   a first cycle of the first multi-cycle instruction is associated with a first convolution operation.

3. The system of claim 2, wherein:
   the cluster-level controller in the given cluster is configured to:
      determine, based on the first multi-cycle instruction, (1) a first sequence of vector operations to be executed by the tensor processors in the given cluster and (2) address information usable to determine the respective spatial partition of an input tensor on which each tensor processor in the given cluster is to operate when performing each vector operation in the first sequence of vector operations; and
      for each vector operation in the first sequence of vector operations:
         generate, based on the address information, a common address offset, relative to a respective base address associated with each tensor processor in the given cluster, at which each tensor processor in the given cluster is to retrieve the respective spatial partition of the input tensor on which the tensor processor is to operate;
         multicast the common address offset to the tensor processors in the given cluster; and
         control the tensor processors in the given cluster to execute the vector operation in lock step;
   each of the vector operations in the first sequence of vector operations comprises one or more of: a vector read operation, a vector addition operation, and a vector multiply operation; and
   each tensor processor in the given cluster comprises a hardware compute array of multiply-and-accumulate (MAC) computation units configured to execute vector operations on the respective spatial partition of the input tensor on which the tensor processor is to operate when performing each vector operation in the first sequence of vector operations.

4. The system of claim 3, wherein:
the cluster-level controller in the given cluster is further configured to:
  determine, based on the first multi-cycle instruction, (3) weight information usable to determine weights to be applied in the one or more convolution operations associated with the first multi-cycle instruction;
  determine, for at least one vector operation in the first sequence of vector operations and dependent on the weight information, a first subset of the weights associated with the first multi-cycle instruction that are associated with the first convolution operation; and
  provide the first subset of the weights that are associated with the first convolution operation to the hardware compute array of at least one of the tensor processors in the given cluster for execution of the first convolution operation in the first cycle of the first multi-cycle instruction.

5. The system of claim 4, wherein:
each tensor processor in the given cluster is configured to generate a respective spatial partition of an output tensor based on the respective spatial partition of the input tensor on which each tensor processor in the given cluster is to operate using single-instruction-multiple-data (SIMD) parallelism;
to implement SIMD parallelism, each tensor processor in the given cluster is configured to implement data parallelism; and
the cluster-level controller is further configured to provide the first subset of the weights that are associated with the first convolution operation to the hardware compute arrays of two or more of the tensor processors in the given cluster for execution of the first convolution operation in the first cycle of the first multi-cycle instruction.

6. The system of claim 5, wherein:
a second cycle of the first multi-cycle instruction is associated with a second convolution operation; and
the cluster-level controller in the given cluster is further configured to:
  determine, for at least one vector operation in the first sequence of vector operations and dependent on the weight information, a second subset of the weights associated with the first multi-cycle instruction that are associated with the second convolution operation; and
  provide the second subset of the weights that are associated with the second convolution operation to the hardware compute arrays of the two or more tensor processors in the given cluster for execution of the second convolution operation in the second cycle of the first multi-cycle instruction.

7. The system of claim 4, wherein the cluster-level controller in the given cluster is further configured to:
  determine, for at least one vector operation in the first sequence of vector operations and dependent on the weight information, a second subset of the weights associated with the first multi-cycle instruction that are associated with the first convolution operation; and
  provide the second subset of the weights that are associated with the first convolution operation to the hardware compute array of one of the tensor processors in the given cluster other than the at least one of the one or more tensor processors in the given cluster for execution of the first convolution operation in the first cycle of the first multi-cycle instruction.

8. The system of claim 2, wherein the cluster-level controller in the given cluster is further configured to:
  receive a second multi-cycle instruction;
  determine, based on the second multi-cycle instruction, (1) a second sequence of vector operations to be executed by the tensor processors in the given cluster and (2) address information usable to determine the respective spatial partition of an input tensor on which each tensor processor in the given cluster is to operate when performing each vector operation in the second sequence of vector operations; and
  for each vector operation in the second sequence of vector operations:
    generate, based on the address information, a common address offset, relative to a respective base address associated with each tensor processor in the given cluster, at which each tensor processor is to retrieve the respective spatial partition of the input tensor on which the tensor processor is to operate;
    multicast the common address offset to the tensor processors in the given cluster; and
    control the tensor processors in the given cluster to execute the vector operation in lock step.

9. The system of claim 1, wherein:
the respective spatial partitions of the input tensor on which each tensor processor in each cluster are to operate are subsets of the input feature map;
each cluster receives a respective multi-cycle instruction;
the respective multi-cycle instructions are distributed across the clusters in accordance with single-instruction-multiple-data (SIMD) parallelism such that at least two of the clusters receive and execute a same multi-cycle instruction while operating on a different subset of the input feature map; and
the at least two clusters operate in parallel and in lock step to execute the same multi-cycle instruction.

10. A method for machine learning acceleration, comprising:
  receiving, by a cluster-level controller of each of a plurality of tensor processor clusters that includes a plurality of tensor processors, a first multi-cycle instruction, wherein each of the plurality of tensor processor clusters receives a respective multi-cycle instruction, and wherein the respective multi-cycle instructions are distributed across the plurality of tensor processor clusters in accordance with single-program-multiple-data (SPMD) parallelism such that at least two of the plurality of tensor processor clusters receive and execute different multi-cycle instructions while operating on an input feature map;
  determining, based on the first multi-cycle instruction, (1) a first sequence of vector operations to be executed by the tensor processors and (2) address information usable to determine a respective spatial partition of an input tensor on which each tensor processor is to operate when performing each vector operation in the first sequence; and
  for each vector operation in the first sequence:
    generating, based on the address information, a common address offset, relative to a respective base address associated with each tensor processor, at which each tensor processor is to retrieve the respective spatial partition on which the tensor processor is to operate;

multicasting the common address offset to the tensor processors; and
controlling the tensor processors to execute the vector operation in lock step.

11. The method of claim 10, wherein:
the first multi-cycle instruction represents a portion of a machine-learning program;
the machine-learning program comprises a plurality of multi-cycle instructions, each of which is associated with one or more convolution operations to be performed in a respective layer in a convolutional neural network;
a first cycle of the first multi-cycle instruction is associated with a first convolution operation; and
each of the vector operations in the first sequence of vector operations comprises one or more of: a vector read operation, a vector addition operation, and a vector multiply operation.

12. The method of claim 11, further comprising:
determining, based on the first multi-cycle instruction, (3) weight information usable to determine weights to be applied in the one or more convolution operations associated with the first multi-cycle instruction;
determining, for at least one vector operation in the first sequence of vector operations and dependent on the weight information, a first subset of the weights associated with the first multi-cycle instruction that are associated with the first convolution operation; and
providing the first subset of the weights that are associated with the first convolution operation to a hardware compute array of at least one of the tensor processors in the cluster for execution of the first convolution operation in the first cycle of the first multi-cycle instruction.

13. The method of claim 12, wherein:
each tensor processor in the cluster is configured to generate a respective spatial partition of an output tensor based on the respective spatial partition of the input tensor on which each tensor processor in the cluster is to operate using single-instruction-multiple-data (SIMD) parallelism;
a second cycle of the first multi-cycle instruction is associated with a second convolution operation; and
the method further comprises:
providing the first subset of the weights that are associated with the first convolution operation to the hardware compute arrays of two or more of the tensor processors in the cluster for execution of the first convolution operation in the first cycle of the first multi-cycle instruction;
determining, for at least one vector operation in the first sequence of vector operations and dependent on the weight information, a second subset of the weights associated with the first multi-cycle instruction that are associated with the second convolution operation; and
providing the second subset of the weights that are associated with the second convolution operation to the hardware compute arrays of the two or more tensor processors in the cluster for execution of the second convolution operation in the second cycle of the first multi-cycle instruction.

14. The method of claim 12, further comprising:
determining, for at least one vector operation in the first sequence of vector operations and dependent on the weight information, a second subset of the weights associated with the first multi-cycle instruction that are associated with the first convolution operation; and
providing the second subset of the weights that are associated with the first convolution operation to the hardware compute array of one of the tensor processors in the cluster other than the at least one of the one or more tensor processors in the cluster for execution of the first convolution operation in the first cycle of the first multi-cycle instruction.

15. One or more computer-readable non-transitory storage media embodying software that is operable when executed to:
receive, at a cluster-level controller of each of a plurality of tensor processor clusters that includes a plurality of tensor processors, a first multi-cycle instruction, wherein each of the plurality of tensor processor clusters receives a respective multi-cycle instruction, and wherein the respective multi-cycle instructions are distributed across the plurality of tensor processor clusters in accordance with single-program-multiple-data (SPMD) parallelism such that at least two of the plurality of tensor processor clusters receive and execute different multi-cycle instructions while operating on an input feature map;
determine, based on the first multi-cycle instruction, (1) a first sequence of vector operations to be executed by the tensor processors and (2) address information usable to determine a respective spatial partition of an input tensor on which each tensor processor is to operate when performing each vector operation in the first sequence; and
for each vector operation in the first sequence:
generate, based on the address information, a common address offset, relative to a respective base address associated with each tensor processor, at which each tensor processor is to retrieve the respective spatial partition on which the tensor processor is to operate;
multicast the common address offset to the tensor processors; and
control the tensor processors to execute the vector operation in lock step.

16. The media of claim 15, wherein:
the first multi-cycle instruction represents a portion of a machine-learning program;
the machine-learning program comprises a plurality of multi-cycle instructions, each of which is associated with one or more convolution operations to be performed in a respective layer in a convolutional neural network;
a first cycle of the first multi-cycle instruction is associated with a first convolution operation;
each of the vector operations in the first sequence of vector operations comprises one or more of: a vector read operation, a vector addition operation, and a vector multiply operation; and
the software is further operable when executed to:
determine, based on the first multi-cycle instruction, (3) weight information usable to determine weights to be applied in the one or more convolution operations associated with the first multi-cycle instruction;
determine, for at least one vector operation in the first sequence of vector operations and dependent on the weight information, a first subset of the weights associated with the first multi-cycle instruction that are associated with the first convolution operation; and provide the first subset of the weights that associated with the first convolution operation to a hardware compute array of at least one of the tensor processors in the cluster for execution of the first convolution operation in the first cycle of the first multi-cycle instruction.

17. The media of claim 16, wherein:

each tensor processor in the cluster is configured to generate a respective spatial partition of an output tensor based on the respective spatial partition of the input tensor on which each tensor processor in the cluster is to operate using single-instruction-multiple-data (SIMD) parallelism;

a second cycle of the first multi-cycle instruction is associated with a second convolution operation; and the software is further operable when executed to:

provide the first subset of the weights that are associated with the first convolution operation to the hardware compute arrays of two or more of the tensor processors in the cluster for execution of the first convolution operation in the first cycle of the first multi-cycle instruction;

determine, for at least one vector operation in the first sequence of vector operations and dependent on the weight information, a second subset of the weights associated with the first multi-cycle instruction that are associated with the second convolution operation; and provide the second subset of the weights that are associated with the second convolution operation to the hardware compute arrays of the two or more tensor processors in the cluster for execution of the second convolution operation in the second cycle of the first multi-cycle instruction.

18. The media of claim 17, wherein the software is further operable when executed to:

determine, for at least one vector operation in the first sequence of vector operations and dependent on the weight information, a second subset of the weights associated with the first multi-cycle instruction that are associated with the first convolution operation; and provide the second subset of the weights that are associated with the first convolution operation to the hardware compute array of one of the tensor processors in the cluster other than the at least one of the one or more tensor processors in the cluster for execution of the first convolution operation in the first cycle of the first multi-cycle instruction.

* * * * *